US012659086B2

(12) United States Patent
Dimou et al.

(10) Patent No.: US 12,659,086 B2
(45) Date of Patent: Jun. 16, 2026

(54) RESOURCE ALLOCATIONS FOR REPETITIONS OF NON-ACKNOWLEDGEMENT FEEDBACK

(71) Applicant: QUALCOMM Incorporated, San Diego, CA (US)

(72) Inventors: Konstantinos Dimou, New York, NY (US); Yan Zhou, San Diego, CA (US); Tao Luo, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 448 days.

(21) Appl. No.: 18/041,992

(22) PCT Filed: Oct. 22, 2021

(86) PCT No.: PCT/US2021/072003
§ 371 (c)(1),
(2) Date: Feb. 16, 2023

(87) PCT Pub. No.: WO2022/087637
PCT Pub. Date: Apr. 28, 2022

(65) Prior Publication Data
US 2023/0327818 A1     Oct. 12, 2023

(30) Foreign Application Priority Data

Oct. 23, 2020     (GR) .............................. 20200100645

(51) Int. Cl.
*H04L 1/1829* (2023.01)
*H04L 5/00* (2006.01)

(52) U.S. Cl.
CPC .......... *H04L 1/1858* (2013.01); *H04L 1/1861* (2013.01); *H04L 5/0055* (2013.01); *H04L 5/0057* (2013.01)

(58) Field of Classification Search
CPC ... H04L 1/1858; H04L 1/1861; H04L 5/0055; H04L 5/0057
See application file for complete search history.

(56) References Cited

U.S. PATENT DOCUMENTS

2009/0207793 A1*  8/2009  Shen ..................... H04L 1/1861
                                                      370/329
2010/0254327 A1* 10/2010  McBeath .............. H04L 1/1812
                                                      370/329

(Continued)

FOREIGN PATENT DOCUMENTS

CN          103283169 A      9/2013
CN          109076546 A     12/2018

OTHER PUBLICATIONS

"PUCCH resource determination for HARQ-ACK for SPS PDSCH"; NTT Docomo; 3GPP TSG RAN WG1 #100 R1-2000924 e-Meeting, Feb. 24-Mar. 6, 2020 (Year: 2020).*

(Continued)

*Primary Examiner* — Benjamin H Elliott, IV
(74) *Attorney, Agent, or Firm* — Arent Fox LLP /Qualcomm Incorporated

(57) ABSTRACT

In an aspect of the disclosure, a method, a computer-readable medium, and an apparatus are provided. The apparatus may be a UE or a component thereof that is configured to transmit, to a network entity on a first set of resources, feedback including an ACK or a NACK corresponding to a transmission from the network entity. The feedback may be transmitted without repetition when the feedback includes the ACK corresponding to the transmission. The apparatus may be further configured to transmit, to the network entity on a second set of resources, a repetition of the feedback when the feedback includes the NACK corresponding to the transmission.

30 Claims, 9 Drawing Sheets

(56)                References Cited

U.S. PATENT DOCUMENTS

| | | | | |
|---|---|---|---|---|
| 2015/0318960 A1* | 11/2015 | Shen | H04L 1/1671 | |
| | | | 370/328 | |
| 2015/0341858 A1* | 11/2015 | Hwang | H04L 1/1854 | |
| | | | 370/311 | |
| 2018/0026755 A1* | 1/2018 | Meng | H04L 1/1829 | |
| | | | 370/429 | |
| 2019/0053217 A1* | 2/2019 | Al-Imari | H04W 76/28 | |
| 2019/0261354 A1* | 8/2019 | Fakoorian | H04L 1/1893 | |
| 2019/0327061 A1* | 10/2019 | Li | H04W 72/0466 | |
| 2019/0386783 A1* | 12/2019 | Chou | H04L 1/1614 | |
| 2020/0092900 A1* | 3/2020 | Dudda | H04L 1/1819 | |
| 2020/0280400 A1* | 9/2020 | Li | H04L 1/1896 | |
| 2021/0297191 A1* | 9/2021 | Takeda | H04L 1/1825 | |
| 2021/0360631 A1* | 11/2021 | Cirik | H04L 1/0073 | |
| 2023/0179342 A1* | 6/2023 | Zhang | H04W 72/232 | |
| | | | 370/329 | |
| 2023/0231662 A1* | 7/2023 | Gou | H04L 1/1861 | |
| | | | 370/329 | |
| 2023/0300816 A1* | 9/2023 | Guo | H04W 72/11 | |
| | | | 370/329 | |
| 2023/0327818 A1* | 10/2023 | Dimou | H04L 1/1858 | |
| | | | 370/329 | |
| 2024/0223317 A1* | 7/2024 | Hu | H04L 5/0055 | |

OTHER PUBLICATIONS

International Search Report and Written Opinion—PCT/US2021/072003—ISA/EPO—Feb. 9, 2022.

* cited by examiner

Repetition of feedback when the feedback indicates a NACK corresponding to a transmission – the feedback being transmitted without repetition when the feedback indicates an ACK corresponding to the transmission Access network
482

404

404

440
1 cycle
442

410
412
410
412

420 ~ SPS
PKT SN0

422 ~ SPS
PKT SN0

426 ~ SPS
PKT SN1

428 ~ SPS
PKT SN1

424 ~ ACK

430 ~ ACK

414

510

. . .

400

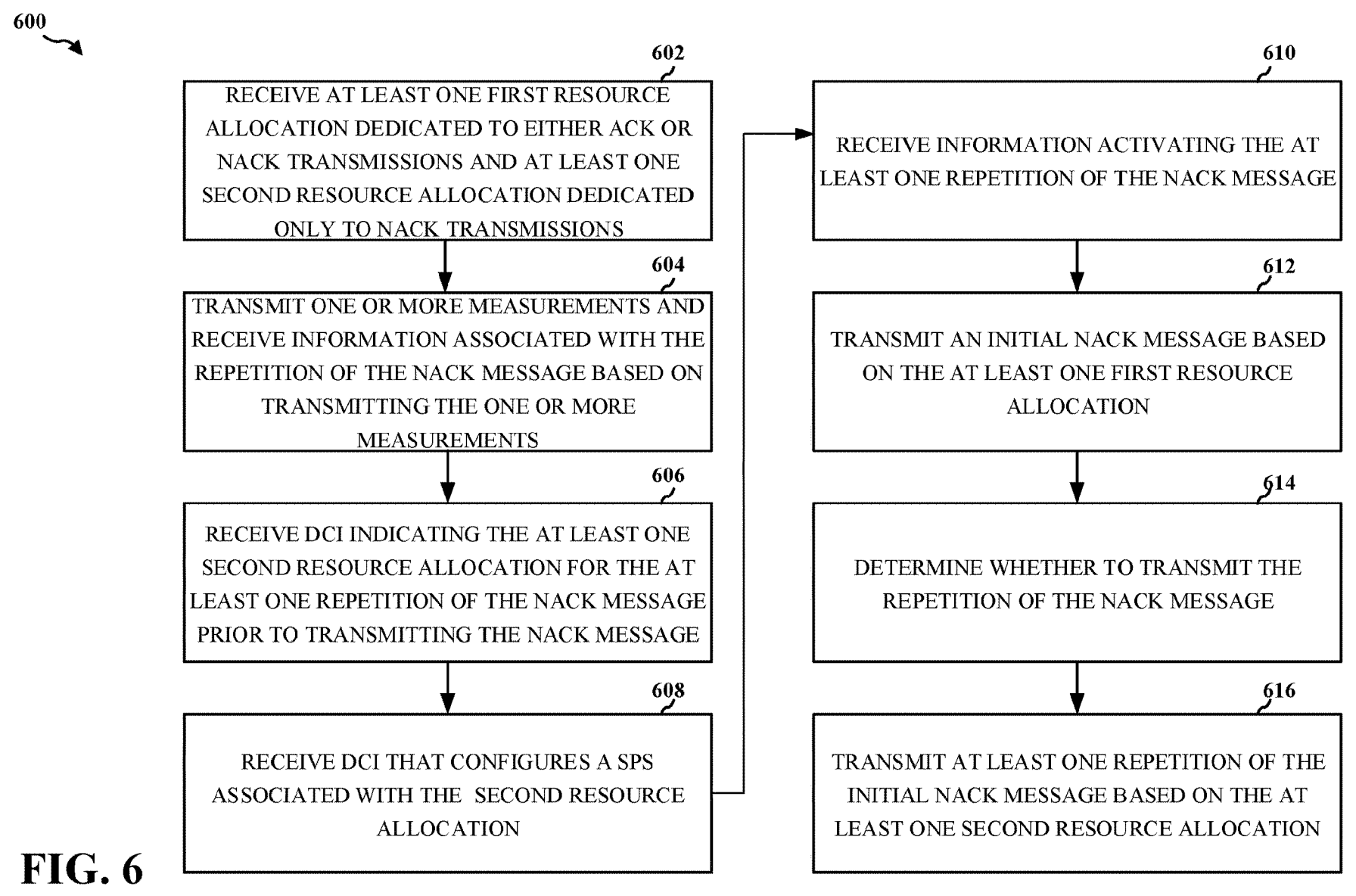

600

602
RECEIVE AT LEAST ONE FIRST RESOURCE ALLOCATION DEDICATED TO EITHER ACK OR NACK TRANSMISSIONS AND AT LEAST ONE SECOND RESOURCE ALLOCATION DEDICATED ONLY TO NACK TRANSMISSIONS

604
TRANSMIT ONE OR MORE MEASUREMENTS AND RECEIVE INFORMATION ASSOCIATED WITH THE REPETITION OF THE NACK MESSAGE BASED ON TRANSMITTING THE ONE OR MORE MEASUREMENTS

606
RECEIVE DCI INDICATING THE AT LEAST ONE SECOND RESOURCE ALLOCATION FOR THE AT LEAST ONE REPETITION OF THE NACK MESSAGE PRIOR TO TRANSMITTING THE NACK MESSAGE

608
RECEIVE DCI THAT CONFIGURES A SPS ASSOCIATED WITH THE SECOND RESOURCE ALLOCATION

610
RECEIVE INFORMATION ACTIVATING THE AT LEAST ONE REPETITION OF THE NACK MESSAGE

612
TRANSMIT AN INITIAL NACK MESSAGE BASED ON THE AT LEAST ONE FIRST RESOURCE ALLOCATION

614
DETERMINE WHETHER TO TRANSMIT THE REPETITION OF THE NACK MESSAGE

616
TRANSMIT AT LEAST ONE REPETITION OF THE INITIAL NACK MESSAGE BASED ON THE AT LEAST ONE SECOND RESOURCE ALLOCATION

FIG. 6

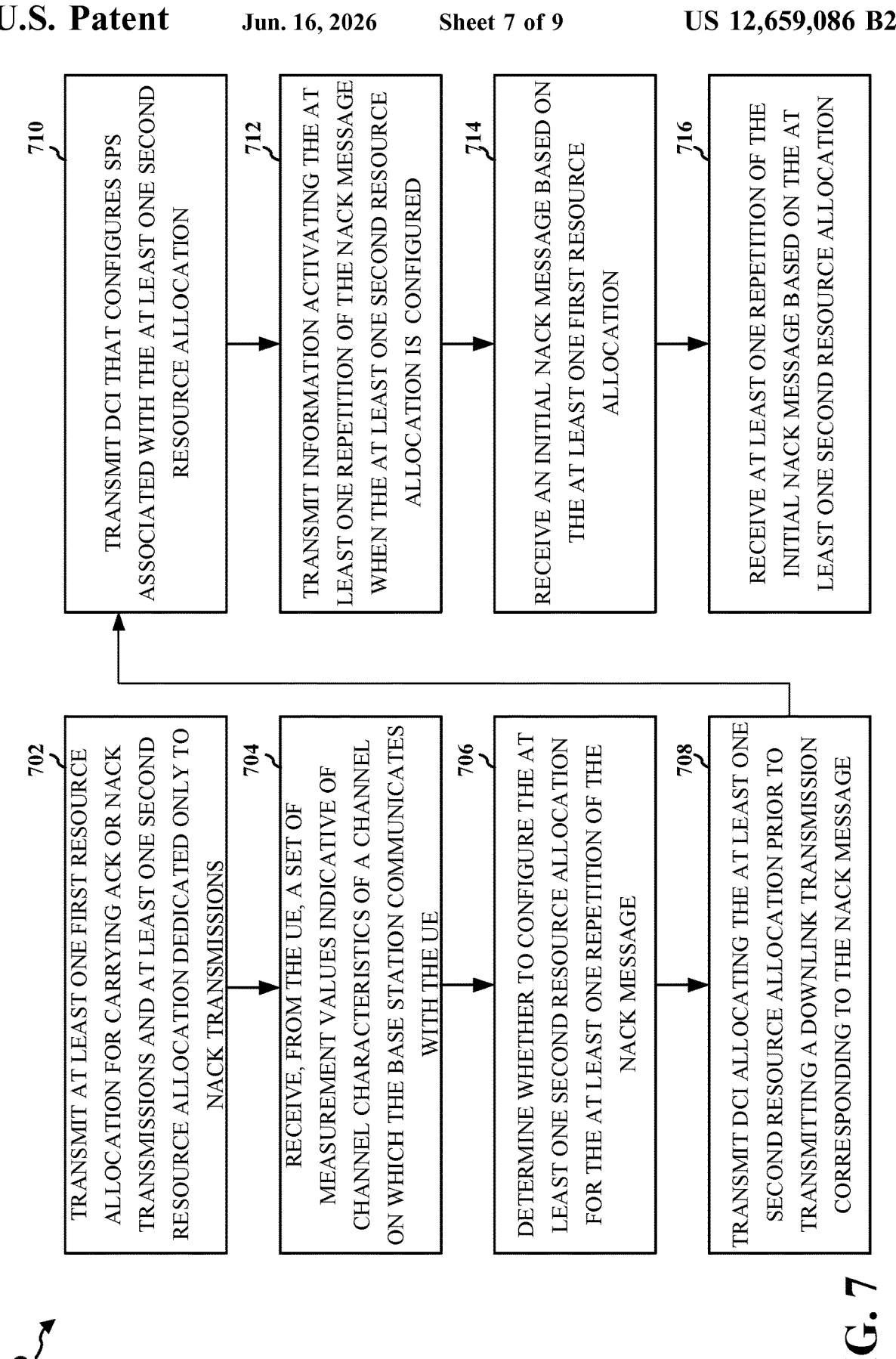

700

710 TRANSMIT DCI THAT CONFIGURES SPS ASSOCIATED WITH THE AT LEAST ONE SECOND RESOURCE ALLOCATION

712 TRANSMIT INFORMATION ACTIVATING THE AT LEAST ONE REPETITION OF THE NACK MESSAGE WHEN THE AT LEAST ONE SECOND RESOURCE ALLOCATION IS CONFIGURED

714 RECEIVE AN INITIAL NACK MESSAGE BASED ON THE AT LEAST ONE FIRST RESOURCE ALLOCATION

716 RECEIVE AT LEAST ONE REPETITION OF THE INITIAL NACK MESSAGE BASED ON THE AT LEAST ONE SECOND RESOURCE ALLOCATION

702 TRANSMIT AT LEAST ONE FIRST RESOURCE ALLOCATION FOR CARRYING ACK OR NACK TRANSMISSIONS AND AT LEAST ONE SECOND RESOURCE ALLOCATION DEDICATED ONLY TO NACK TRANSMISSIONS

704 RECEIVE, FROM THE UE, A SET OF MEASUREMENT VALUES INDICATIVE OF CHANNEL CHARACTERISTICS OF A CHANNEL ON WHICH THE BASE STATION COMMUNICATES WITH THE UE

706 DETERMINE WHETHER TO CONFIGURE THE AT LEAST ONE SECOND RESOURCE ALLOCATION FOR THE AT LEAST ONE REPETITION OF THE NACK MESSAGE

708 TRANSMIT DCI ALLOCATING THE AT LEAST ONE SECOND RESOURCE ALLOCATION PRIOR TO TRANSMITTING A DOWNLINK TRANSMISSION CORRESPONDING TO THE NACK MESSAGE

FIG. 7

RESOURCE ALLOCATIONS FOR REPETITIONS OF NON-ACKNOWLEDGEMENT FEEDBACK

CROSS REFERENCE TO RELATED APPLICATION(S)

This application is a National Phase entry of PCT Application No. PCT/US2021/072003, entitled "RESOURCE ALLOCATIONS FOR REPETITIONS OF NON-AC-KNOWLEDGEMENT FEEDBACK" and filed on Oct. 22, 2021, which claims priority of Greek application Ser. No. 20/200,100645, entitled "ON DEMAND REPETITION IN SPACE/TIME/FREQUENCY FOR HARQ NACK" and filed on Oct. 23, 2020, both of which are expressly incorporated by reference herein in their entirety.

BACKGROUND

Technical Field

The present disclosure generally relates to communication systems, and more particularly, to scheduling and configurations for transmission and repetition of hybrid automatic repeat request (HARQ) feedback.

Introduction

Wireless communication systems are widely deployed to provide various telecommunication services such as telephony, video, data, messaging, and broadcasts. Typical wireless communication systems may employ multiple-access technologies capable of supporting communication with multiple users by sharing available system resources. Examples of such multiple-access technologies include code division multiple access (CDMA) systems, time division multiple access (TDMA) systems, frequency division multiple access (FDMA) systems, orthogonal frequency division multiple access (OFDMA) systems, single-carrier frequency division multiple access (SC-FDMA) systems, and time division synchronous code division multiple access (TD-SCDMA) systems.

These multiple access technologies have been adopted in various telecommunication standards to provide a common protocol that enables different wireless devices to communicate on a municipal, national, regional, and even global level. An example telecommunication standard is 5G New Radio (NR). 5G NR is part of a continuous mobile broadband evolution promulgated by Third Generation Partnership Project (3GPP) to meet new requirements associated with latency, reliability, security, scalability (e.g., with Internet of Things (IoT)), and other requirements. 5G NR includes services associated with enhanced mobile broadband (eMBB), massive machine type communications (mMTC), and ultra-reliable low-latency communications (URLLC). Some aspects of 5G NR may be based on the 4G Long Term Evolution (LTE) standard. There exists a need for further improvements in 5G NR technology. These improvements may also be applicable to other multi-access technologies and the telecommunication standards that employ these technologies.

SUMMARY

The following presents a simplified summary of one or more aspects in order to provide a basic understanding of such aspects. This summary is not an extensive overview of all contemplated aspects, and is intended to neither identify key or critical elements of all aspects nor delineate the scope of any or all aspects. Its sole purpose is to present some concepts of one or more aspects in a simplified form as a prelude to the more detailed description that is presented later.

In some radio access or other wireless networks, certain traffic may be expected to meet various conditions, e.g., as part of use cases for which such traffic is communicated. In the context of some radio access technologies (RATs), such as 5G New Radio (NR), certain traffic may be expected to exhibit reliability and/or latency characteristics that do not violate respective thresholds. For example, traffic identified as ultra-reliable low-latency communications (URLLC) or Industrial Internet of Things (IIoT) may be expected to satisfy an applicable error rate threshold, such as a threshold of $10^{-5}$ packet error probability or packet error rate (PER), while also satisfying an applicable latency threshold, such as a threshold of 0.5 milliseconds (ms) or one (1) ms.

Certain RATs may implement error correction or control using hybrid automatic repeat request (HARQ) acknowledgement (ACK) or non-ACK (NACK) feedback. For example, a user equipment (UE) may be assigned specific uplink resources for reporting HARQ ACK/NACK feedback corresponding to downlink packets, protocol data units (PDUs), etc. from a base station (or other network entity). In real world deployments, however, HARQ feedback mechanisms cannot be realistically expected to flawlessly operate at all times. Illustratively, the base station may erroneously find HARQ NACK feedback where none is intended, for example, due to a channel properties resulting in the base station incorrectly interpreting HARQ resources as empty, or due to decoding errors resulting in the base station erroneously finding HARQ ACK feedback.

HARQ feedback errors may cause latency and/or reliability to suffer, which may negatively impact performance and user experience, and further, may prevent certain traffic from operating according to the applicable use case parameters expected thereof (e.g., reliability parameters including PER or packet error probability not to exceed 10-5, latency parameters including packet transmission time not to exceed 0.5 ms or one (1) ms). Moreover, performance declines initiated by one erroneous interpretation of a HARQ resource may be compounded or otherwise exacerbated while the erroneous interpretation is propagated through the system, e.g., until the base station and UE are able to correct packet alignment, reacquire synchronization, etc. Therefore, a need exists to improve reliability when communicating HARQ feedback, e.g., in systems and networks in which latency, reliability, and/or other constraints are imposed upon certain traffic, such as URLLC and IIoT.

The present disclosure describes various low-overhead mechanisms via which HARQ feedback errors may be avoided and/or corrected. In particular, the present disclosure provides various approaches and solutions designed to improve reliability when communicating HARQ feedback in a manner that does not increase latency beyond levels considered acceptable for applicable use cases. For example, various aspects described herein may increase the reliability of HARQ feedback for URLLC and/or IIoT traffic without exceeding the URLLC and/or IIoT delay budgets, respectively. In some instances, the concepts and various aspects described herein may enable certain traffic to adhere to use case parameters expected thereof, in addition or alternative to mitigating or preventing latency escalation and/or reliability degradation that may be compounded or propagated over time while the base station and UE resolve packet (or PDU) mismatches, synchronization errors, and/or other alignment discrepancies.

In an aspect of the disclosure, a method, a computer-readable medium, and an apparatus are provided. The apparatus may be a UE or a component thereof that is configured to transmit, to a network entity on a first set of resources, feedback including an ACK or a NACK corresponding to a transmission from the network entity. The feedback may be transmitted without repetition when the feedback includes the ACK corresponding to the transmission. The apparatus may be further configured to transmit, to the network entity on a second set of resources, a repetition of the feedback when the feedback includes the NACK corresponding to the transmission.

In another aspect of the disclosure, another method, another computer-readable medium, and another apparatus are provided. The other apparatus may be a network entity or a component thereof that is configured to decode feedback received from a UE on a first set of resources, with the feedback including an ACK or a NACK corresponding to a transmission to the UE. The other apparatus may be further configured to decode a repetition of the feedback received from the UE on a second set of resources when the feedback decoded on the first set of resources includes the NACK corresponding to the transmission.

To the accomplishment of the foregoing and related ends, the one or more aspects comprise the features hereinafter fully described and particularly pointed out in the claims. The following description and the annexed drawings set forth in detail certain illustrative features of the one or more aspects. These features are indicative, however, of but a few of the various ways in which the principles of various aspects may be employed, and this description is intended to include all such aspects and their equivalents.

BRIEF DESCRIPTION OF THE DRAWINGS

FIG. 6 is a flowchart of a method of wireless communication by a UE.

FIG. 7 is a flowchart of a method of wireless communication by a network entity.

DETAILED DESCRIPTION

Figure 1:
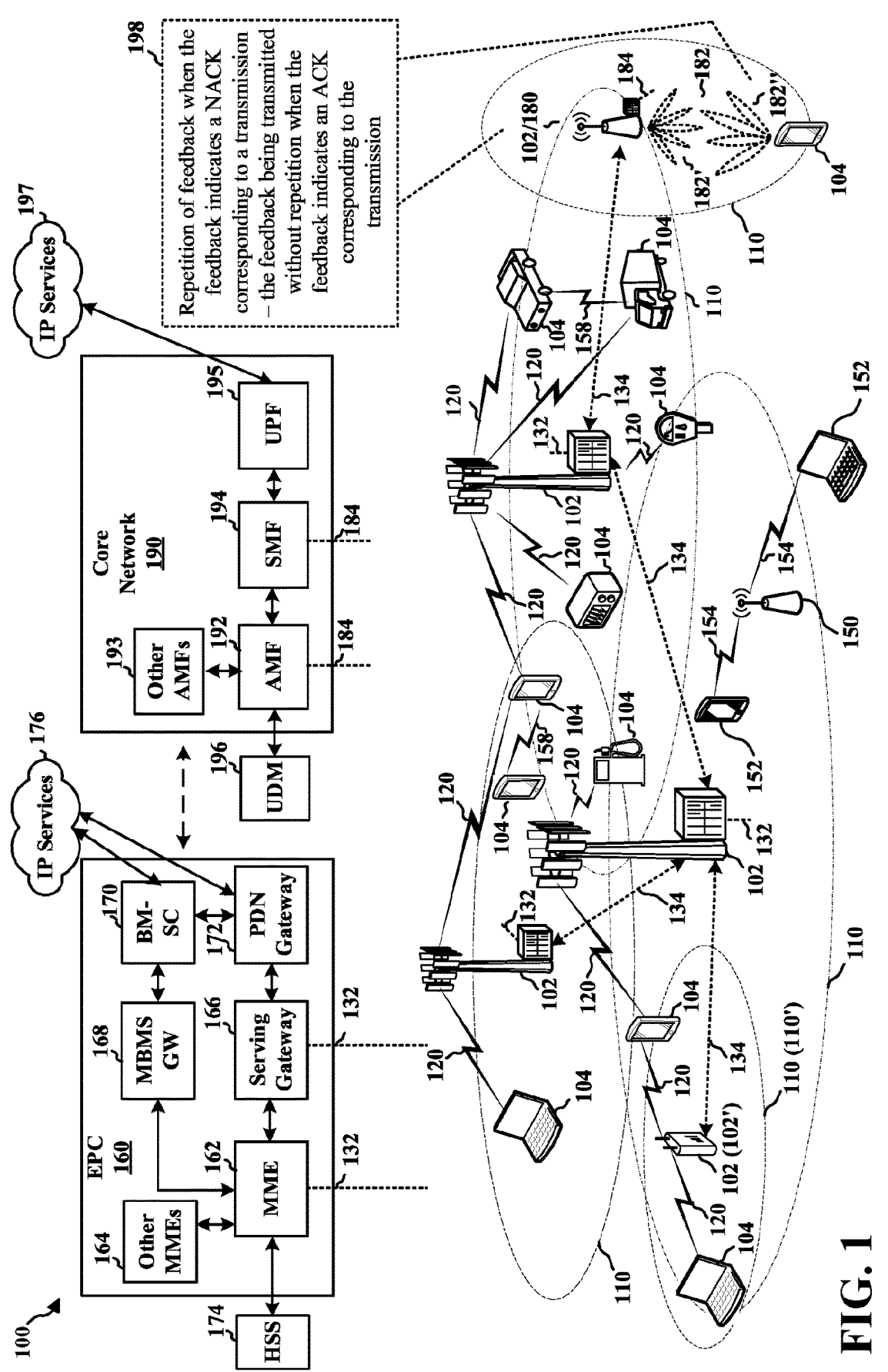
FIG. 1 is a diagram illustrating an example of a wireless communications system and an access network.

The detailed description set forth below in connection with the appended drawings is intended as a description of various configurations and is not intended to represent the only configurations in which the concepts described herein may be practiced. The detailed description includes specific details for the purpose of providing a thorough understanding of various concepts. However, a person having ordinary skill in the art will recognize that these concepts and related aspects may be implemented in the absence of some or all of such specific details. In some instances, well-known structures, components, and the like are shown in block diagram form in order to avoid obscuring such concepts.

Several aspects of telecommunication systems will now be presented with reference to various apparatus and methods. These apparatus and methods will be described in the following detailed description and illustrated in the accompanying drawings by various blocks, components, circuits, processes, algorithms, etc. (collectively referred to as "elements"). These elements may be implemented using electronic hardware, computer software, or any combination thereof. Whether such elements are implemented as hardware or software depends upon the particular application and design constraints imposed on the overall system.

By way of example, an element, or any portion of an element, or any combination of elements may be implemented as a "processing system" that includes one or more processors. Examples of processors include microprocessors, microcontrollers, graphics processing units (GPUs), central processing units (CPUs), application processors, digital signal processors (DSPs), reduced instruction set computing (RISC) processors, systems on a chip (SoC), baseband processors, field programmable gate arrays (FPGAs), programmable logic devices (PLDs), state machines, gated logic, discrete hardware circuits, and other suitable hardware configured to perform the various functionality described throughout this disclosure. One or more processors in the processing system may execute software. Software shall be construed broadly to mean instructions, instruction sets, computer-executable code, code segments, program code, programs, subprograms, software components, applications, software applications, software packages, routines, subroutines, objects, executables, threads of execution, procedures, functions, etc., whether referred to as software, firmware, middleware, microcode, hardware description language, or otherwise.

Accordingly, in one or more example embodiments, the functions described may be implemented in hardware, software, or any combination thereof. If implemented in software, the functions may be stored on or encoded as one or more instructions or computer-executable code on a computer-readable medium. Computer-readable media includes computer storage media. Storage media may be any available media that can be accessed by a computer. By way of example, and not limitation, such computer-readable media can comprise a random-access memory (RAM), a read-only memory (ROM), an electrically erasable programmable ROM (EEPROM), optical disk storage, magnetic disk storage, other magnetic storage devices, combinations of the aforementioned types of computer-readable media, or any other medium that can be used to store computer-executable code in the form of instructions or data structures that can be accessed by a computer.

In some radio access or other wireless networks, certain traffic may be expected to meet various conditions, e.g., as part of use cases for which such traffic is communicated. In the context of some radio access technologies (RATs), such as 5G New Radio (NR), certain traffic may be expected to exhibit reliability and/or latency characteristics that do not violate respective thresholds. For example, traffic identified as ultra-reliable low-latency communications (URLLC) or Industrial Internet of Things (IIoT) may be expected to satisfy an applicable error rate threshold, such as a threshold of $10^{-5}$ packet error probability or packet error rate (PER), while also satisfying an applicable latency threshold, such as a threshold of 0.5 milliseconds (ms) or one (1) ms.

Certain RATs may implement error correction or control using hybrid automatic repeat request (HARQ) acknowledgement (ACK) or non-ACK (NACK) feedback (NACK may additionally or alternatively refer to "negative ACK"). For example, a user equipment (UE) may be assigned specific uplink resources for reporting HARQ ACK/NACK feedback corresponding to downlink packets, protocol data units (PDUs), etc. from a base station (or other network entity). In real world deployments, however, HARQ feedback mechanisms cannot be realistically expected to flawlessly operate at all times. Illustratively, the base station may erroneously find HARQ NACK feedback where none is intended, for example, due to a channel properties resulting in the base station incorrectly interpreting HARQ resources as empty, or due to decoding errors resulting in the base station erroneously finding HARQ ACK feedback.

In networks in which some or all traffic is carried in a millimeter wave (mmW) or near-mmW spectrum, the reliability of air interface and/or other wirelessly communicated traffic may be a function of various factors, including environmental factors (e.g., blockers, reflectors, and the like), network characteristics, resource availability, and the like. Such factors are inherently unpredictable in real world deployments, and will often vary within relatively short time periods. Therefore, communication over the air interface or other wireless communication interface, e.g., between base stations (or other network entities) and UE, may benefit from low-overhead mechanisms designed to mitigate some adverse effects of those factors.

While beam and/or channel reciprocity may not necessarily be relied upon at all times for channel measurements and/or scheduling, beams or channels being blocked in one direction may indicate beams or channels being blocked in the other direction. For example, a downlink receive (RX) beam configured on a physical downlink shared channel (PDSCH) that is blocked may be indicative of an uplink transmit (TX) beam configured on a physical uplink control channel (PUCCH) also being blocked.

In certain instances, base stations (and/or other network entities) may expect HARQ ACK or NACK feedback on specific resources where none is found. Where neither ACK nor NACK feedback is detected on a HARQ resource, such as where HARQ resource energy is below a threshold or where a HARQ resource is incorrectly decoded, a discontinuous transmission (DTX) may be assumed. In some instances, DTX may imply that the UE failed to receive a transmission, and so was unaware of, and did not respond with, HARQ feedback expected for that transmission.

In some implementations, a base station may interpret DTX on a HARQ resource as NACK feedback, which may prompt a base station to retransmit the information corresponding to the HARQ resource without knowing the cause of the DTX. For example, DTX on the HARQ resource may result from a beam being blocked or may result from frequency selective fading (e.g., where the number of antennas at the UE is equal to the number used by the base station). In response to a HARQ resource DTX (e.g., interpreted as NACK feedback), the base station may select a new beam for transmission, but the new beam may experience the same failures as the previously used beam, which may again result in NACK feedback for the retransmitted information (e.g., as again indicated by DTX on the corresponding HARQ resource).

In certain other instances, the UE may transmit NACK feedback on a HARQ resource, but the base station may erroneously detect ACK feedback on the HARQ resource, e.g., due to interference on the uplink channel, a decoding error, and the like. In response to the erroneously detected ACK feedback, the base station may proceed to transmit the next portion (e.g., packet, protocol data unit (PDU), segment, section, etc.) of information while the UE is expecting a retransmission of the previous portion of information. Consequently, consecutive errors may occur on the channel (e.g., PDSCH), as the UE may also provide NACK feedback in response to unexpectedly receiving the next portion of information.

In the abovementioned and other instances, ineffectively and/or erroneously interpreted HARQ feedback may adversely impact throughput and/or reliability, e.g., as latency and error rates may increase in direct relation to such ineffectively and/or erroneously interpreted HARQ feedback. Therefore, a need exists to improve reliability when communicating HARQ feedback.

The present disclosure describes various low-overhead mechanisms via which HARQ feedback errors may be avoided and/or corrected. In particular, the present disclosure provides various approaches and solutions designed to improve reliability when communicating HARQ feedback in a manner that does not increase latency beyond levels considered acceptable for applicable use cases. For example, various aspects described herein may increase the reliability of HARQ feedback for URLLC and/or IIoT traffic without exceeding the URLLC and/or IIoT delay budgets, respectively. In some instances, the concepts and various aspects described herein may enable certain traffic to adhere to use case parameters expected thereof, in addition or alternative to mitigating or preventing latency escalation and/or reliability degradation that may be compounded or propagated over time while the base station and UE resolve packet (or PDU) mismatches, synchronization errors, and/or other alignment discrepancies.

In some aspects of the present disclosure, the various approaches and solutions are realized through NACK repetition following an initial transmission of HARQ feedback. For example, in addition to a resource on an uplink control channel (e.g., PUCCH) configured to carry an initial HARQ ACK/NACK transmission for a corresponding transmission scheduled on a downlink data channel (e.g., PDSCH), at least one other resource may be configured to carry at least one repetition of the HARQ feedback. In some aspects, however, repetitions of the HARQ feedback may be transmitted when indicating NACK, whereas no repetitions of the HARQ feedback may be transmitting when indicating ACK. In some other aspects, repetitions of the HARQ feedback may be selectively transmitted, rather than invariably transmitted, with each HARQ feedback transmission.

FIG. 1 is a diagram illustrating an example of a wireless communications system and an access network 100. The wireless communications system (also referred to as a wireless wide area network (WWAN)) includes base stations 102, UEs 104, an Evolved Packet Core (EPC) 160, and another core network 190 (e.g., a 5G Core (5GC)). The base stations 102 may include macrocells (high power cellular base station) and/or small cells (low power cellular base station). The macrocells include base stations. The small cells include femtocells, picocells, and microcells.

The base stations 102 configured for 4G Long Term Evolution (LTE) (collectively referred to as Evolved Universal Mobile Telecommunications System (UMTS) Terrestrial Radio Access Network (E-UTRAN)) may interface with the EPC 160 through first backhaul links 132 (e.g., S1 interface). The base stations 102 configured for 5G NR, which may be collectively referred to as Next Generation radio access network (RAN) (NG-RAN), may interface with core network 190 through second backhaul links 184. In addition to other functions, the base stations 102 may perform one or more of the following functions: transfer of user data, radio channel ciphering and deciphering, integrity protection, header compression, mobility control functions (e.g., handover, dual connectivity), inter-cell interference coordination, connection setup and release, load balancing, distribution for non-access stratum (NAS) messages, NAS node selection, synchronization, RAN sharing, Multimedia Broadcast Multicast Service (MBMS), subscriber and equipment trace, RAN information management (RIM), paging, positioning, and delivery of warning messages.

In some aspects, the base stations 102 may communicate directly or indirectly (e.g., through the EPC 160 or core network 190) with each other over third backhaul links 134 (e.g., X2 interface). The first backhaul links 132, the second backhaul links 184, and the third backhaul links 134 may be wired, wireless, or some combination thereof. At least some of the base stations 102 may be configured for integrated access and backhaul (IAB). Accordingly, such base stations may wirelessly communicate with other base stations, which also may be configured for IAB.

At least some of the base stations 102 configured for IAB may have a split architecture that includes at least one of a central unit (CU), a distributed unit (DU), a radio unit (RU), a remote radio head (RRH), and/or a remote unit, some or all of which may be collocated or distributed and/or may communicate with one another. In some configurations of such a split architecture, a CU may implement some or all functionality of a radio resource control (RRC) layer, whereas a DU may implement some or all of the functionality of a radio link control (RLC) layer.

Illustratively, some of the base stations 102 configured for IAB may communicate through a respective CU with a DU of an IAB donor node or other parent IAB node (e.g., a base station), and further, may communicate through a respective DU with child IAB nodes (e.g., other base stations) and/or one or more of the UEs 104. One or more of the base stations 102 configured for IAB may be an IAB donor connected through a CU with at least one of the EPC 160 and/or the core network 190. With such a connection to the EPC 160 and/or core network 190, a base station 102 operating as an IAB donor may provide a link to the EPC 160 and/or core network 190 for one or more UEs and/or other IAB nodes, which may be directly or indirectly connected (e.g., separated from an IAB donor by more than one hop) with the IAB donor. In the context of communicating with the EPC 160 or the core network 190, both the UEs and IAB nodes may communicate with a DU of an IAB donor. In some additional aspects, one or more of the base stations 102 may be configured with connectivity in an open RAN (ORAN) and/or a virtualized RAN (VRAN), which may be enabled through at least one respective CU, DU, RU, RRH, and/or remote unit.

The base stations 102 may wirelessly communicate with the UEs 104. Examples of UEs 104 include a cellular phone, a smart phone, a session initiation protocol (SIP) phone, a laptop, a personal digital assistant (PDA), a satellite radio, a global positioning system, a multimedia device, a video device, a digital audio player (e.g., MP3 player), a camera, a game console, a tablet, a smart device, a wearable device, a vehicle, an electric meter, a gas pump, a large or small kitchen appliance, a healthcare device, an implant, a sensor/actuator, a display, or any other similar functioning device. Some of the UEs 104 may be referred to as IoT devices (e.g., parking meter, gas pump, toaster, vehicles, heart monitor, etc.). The UE 104 may also be referred to as a station, a mobile station, a subscriber station, a mobile unit, a subscriber unit, a wireless unit, a remote unit, a mobile device, a wireless device, a wireless communications device, a remote device, a mobile subscriber station, an access terminal, a mobile terminal, a wireless terminal, a remote terminal, a handset, a user agent, a mobile client, a client, or some other suitable terminology.

Each of the base stations 102 may provide communication coverage for a respective geographic coverage area 110, which may also be referred to as a "cell." Potentially, two or more geographic coverage areas 110 may at least partially overlap with one another, or one of the geographic coverage areas 110 may contain another of the geographic coverage areas. For example, the small cell 102' may have a coverage area 110' that overlaps with the coverage area 110 of one or more macro base stations 102. A network that includes both small cell and macrocells may be known as a heterogeneous network. A heterogeneous network may also include Home Evolved Node Bs (eNBs) (HeNBs), which may provide service to a restricted group known as a closed subscriber group (CSG).

The communication links 120 between the base stations 102 and the UEs 104 may include uplink (also referred to as reverse link) transmissions from a UE 104 to a base station 102 and/or downlink (also referred to as forward link) transmissions from a base station 102 to a UE 104. The communication links 120 may use multiple-input and multiple-output (MIMO) antenna technology, including spatial multiplexing, beamforming, and/or transmit diversity. Wireless links or radio links may be on one or more carriers, or component carriers (CCs). The base stations 102 and/or UEs 104 may use spectrum up to Y megahertz (MHz) (e.g., Y may be equal to or approximately equal to 5, 10, 15, 20, 100, 400, etc.) bandwidth per carrier allocated in a carrier aggregation of up to a total of Yx MHz (e.g., x CCs) used for transmission in each direction. The CCs may or may not be adjacent to each other. Allocation of CCs may be asymmetric with respect to downlink and uplink (e.g., more or fewer CCs may be allocated for downlink than for uplink).

The CCs may include a primary CC and one or more secondary CCs. A primary CC may be referred to as a primary cell (PCell) and each secondary CC may be referred to as a secondary cell (SCell). The PCell may also be referred to as a "serving cell" when the UE is known both to a base station at the access network level and to at least one core network entity (e.g., AMF and/or MME) at the core network level, and the UE may be configured to receive downlink control information in the access network (e.g., the UE may be in an RRC Connected state). In some instances in which carrier aggregation is configured for the UE, each of the PCell and the one or more SCells may be a serving cell.

Certain UEs 104 may communicate with each other using device-to-device (D2D) communication link 158. The D2D communication link 158 may use the downlink/uplink WWAN spectrum. The D2D communication link 158 may use one or more sidelink channels, such as a physical sidelink broadcast channel (PSBCH), a physical sidelink discovery channel (PSDCH), a physical sidelink shared channel (PSSCH), and a physical sidelink control channel (PSCCH). D2D communication may be through a variety of wireless D2D communications systems, such as for example, WiMedia, Bluetooth, ZigBee, Wi-Fi based on the Institute of Electrical and Electronics Engineers (IEEE) 802.11 standard, LTE, or NR.

The wireless communications system may further include a Wi-Fi access point (AP) 150 in communication with Wi-Fi stations (STAs) 152 via communication links 154, e.g., in a 5 gigahertz (GHz) unlicensed frequency spectrum or the like. When communicating in an unlicensed frequency spectrum, the STAs 152/AP 150 may perform a clear channel assessment (CCA) prior to communicating in order to determine whether the channel is available.

The small cell 102' may operate in a licensed and/or an unlicensed frequency spectrum. When operating in an unlicensed frequency spectrum, the small cell 102' may employ NR and use the same unlicensed frequency spectrum (e.g., 5 GHz, or the like) as used by the Wi-Fi AP 150. The small cell 102', employing NR in an unlicensed frequency spectrum, may boost coverage to and/or increase capacity of the access network.

The electromagnetic spectrum is often subdivided, based on frequency/wavelength, into various classes, bands, channels, etc. In 5G NR, two initial operating bands have been identified as frequency range designations FR1 (410 MHz-7.125 GHz) and FR2 (24.25 GHz-52.6 GHz). The frequencies between FR1 and FR2 are often referred to as mid-band frequencies. Although a portion of FR1 is greater than 6 GHz, FR1 is often referred to (interchangeably) as a "sub-6 GHz" band in various documents and articles. A similar nomenclature issue sometimes occurs with regard to FR2, which is often referred to (interchangeably) as a "millimeter wave" (or "mmWave" or simply "mmW") band in documents and articles, despite being different from the extremely high frequency (EHF) band (30 GHz-300 GHz) which is identified by the International Telecommunications Union (ITU) as a "millimeter wave" band.

With the above aspects in mind, unless specifically stated otherwise, the term "sub-6 GHz," "sub-7 GHz," and the like, to the extent used herein, may broadly represent frequencies that may be less than 6 GHz, frequencies that may be less than 7 GHz, frequencies that may be within FR1, and/or frequencies that may include mid-band frequencies. Further, unless specifically stated otherwise, the term "millimeter wave" and other similar references, to the extent used herein, may broadly represent frequencies that may include mid-band frequencies, frequencies that may be within FR2, and/or frequencies that may be within the EHF band.

A base station 102, whether a small cell 102' or a large cell (e.g., macro base station), may include and/or be referred to as an eNB, gNodeB (gNB), or another type of base station. Some base stations 180, such as gNBs, may operate in a traditional sub 6 GHz spectrum, in mmW frequencies, and/or near-mmW frequencies in communication with the UE 104. When such a base station 180 (e.g., gNB) operates in mmW or near-mmW frequencies, the base station 180 may be referred to as a mmW base station. The (mmW) base station 180 may utilize beamforming 182 with the UE 104 to compensate for the path loss and short range. The base station 180 and the UE 104 may each include a plurality of antennas, such as antenna elements, antenna panels, and/or antenna arrays to facilitate the beamforming.

The base station 180 may transmit a beamformed signal to the UE 104 in one or more transmit directions 182'. The UE 104 may receive the beamformed signal from the base station 180 in one or more receive directions 182". The UE 104 may also transmit a beamformed signal to the base station 180 in one or more transmit directions. The base station 180 may receive the beamformed signal from the UE 104 in one or more receive directions. One or both of the base station 180 and/or the UE 104 may perform beam training to determine the best receive and/or transmit directions for the one or both of the base station 180 and/or UE 104. The transmit and receive directions for the base station 180 may or may not be the same. The transmit and receive directions for the UE 104 may or may not be the same.

In various different aspects, one or more of the base stations 102/180 may include and/or be referred to as a gNB, Node B, eNB, an access point, a base transceiver station, a radio base station, a radio transceiver, a transceiver function, a basic service set (BSS), an extended service set (ESS), a transmit reception point (TRP), or some other suitable terminology.

In some aspects, one or more of the base stations 102/180 may be connected to the EPC 160 and may provide respective access points to the EPC 160 for one or more of the UEs 104. The EPC 160 may include a Mobility Management Entity (MME) 162, other MMEs 164, a Serving Gateway 166, an MBMS Gateway 168, a Broadcast Multicast Service Center (BM-SC) 170, and a Packet Data Network (PDN) Gateway 172. The MME 162 may be in communication with a Home Subscriber Server (HSS) 174. The MME 162 is the control node that processes the signaling between the UEs 104 and the EPC 160. Generally, the MME 162 provides bearer and connection management. All user Internet protocol (IP) packets are transferred through the Serving Gateway 166, with the Serving Gateway 166 being connected to the PDN Gateway 172. The PDN Gateway 172 provides UE IP address allocation as well as other functions. The PDN Gateway 172 and the BM-SC 170 are connected to the IP Services 176. The IP Services 176 may include the Internet, an intranet, an IP Multimedia Subsystem (IMS), a Packet Switch (PS) Streaming Service, and/or other IP services. The BM-SC 170 may provide functions for MBMS user service provisioning and delivery. The BM-SC 170 may serve as an entry point for content provider MBMS transmission, may be used to authorize and initiate MBMS Bearer Services within a public land mobile network (PLMN), and may be used to schedule MBMS transmissions. The MBMS Gateway 168 may be used to distribute MBMS traffic to the base stations 102 belonging to a Multicast Broadcast Single Frequency Network (MBSFN) area broadcasting a particular service, and may be responsible for session management (start/stop) and for collecting eMBMS related charging information.

In some other aspects, one or more of the base stations 102/180 may be connected to the core network 190 and may provide respective access points to the core network 190 for one or more of the UEs 104. The core network 190 may include an Access and Mobility Management Function (AMF) 192, other AMFs 193, a Session Management Function (SMF) 194, and a User Plane Function (UPF) 195. The AMF 192 may be in communication with a Unified Data Management (UDM) 196. The AMF 192 is the control node that processes the signaling between the UEs 104 and the core network 190. Generally, the AMF 192 provides Quality of Service (QoS) flow and session management. All user IP packets are transferred through the UPF 195. The UPF 195 provides UE IP address allocation as well as other functions. The UPF 195 is connected to the IP Services 197. The IP Services 197 may include the Internet, an intranet, an IMS, a PS Streaming Service, and/or other IP services.

In certain aspects, the UE 104 may be configured to transmit, to a base station 102/180 on a first set of resources, feedback including an ACK or a NACK corresponding to a transmission from the base station 102/180. In some aspects, the feedback may be transmitted without repetition when the feedback includes the ACK corresponding to the transmission. The UE 104 may be further configured to transmit, to the base station 102/180 on a second set of resources, a repetition of the feedback (198) when the feedback includes the NACK corresponding to the transmission.

Correspondingly, the base station 102/180 may be configured to decode feedback received from the UE 104 on a first set of resources, with the feedback including an ACK or a NACK corresponding to a transmission to the UE 104. The base station 102/180 may be further configured to decode a repetition of the feedback (198) received from the UE 104 on a second set of resources when the feedback decoded on the first set of resources includes the NACK corresponding to the transmission. However, the base station 102/180 may refrain from decoding information on the second set of resources when the feedback decoded on the first set of resources include the NACK corresponding to the transmission.

Although the present disclosure may focus on 5G NR, the concepts and various aspects described herein may be applicable to other similar areas, such as LTE, LTE-Advanced (LTE-A), Code Division Multiple Access (CDMA), Global System for Mobile communications (GSM), or other wireless/radio access technologies.

Figures 2A, 2B, 2C, 2D:
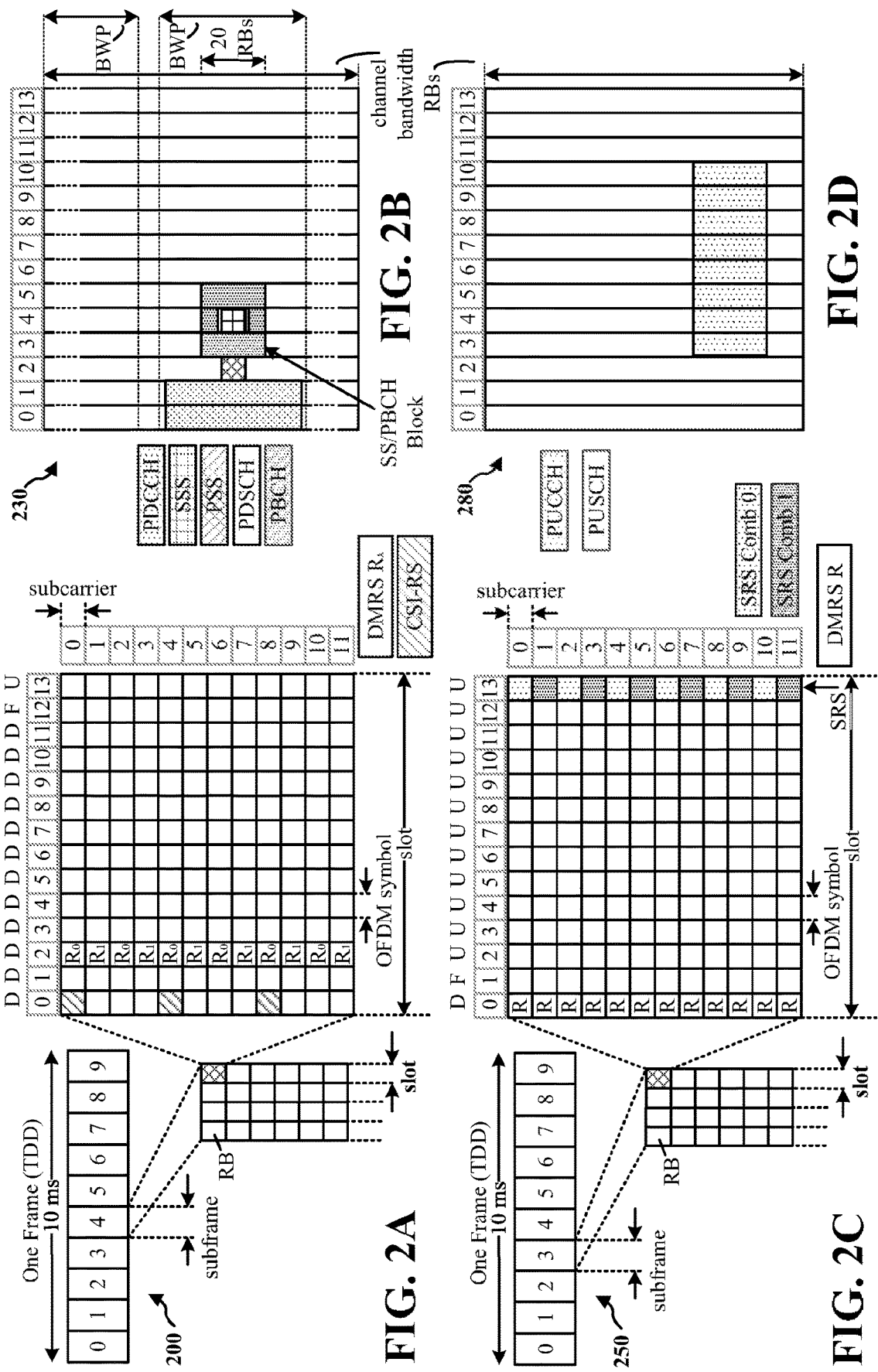
FIG. 2A is a diagram illustrating an example of a first frame, in accordance with various aspects of the present disclosure.
FIG. 2B is a diagram illustrating an example of downlink channels within a subframe, in accordance with various aspects of the present disclosure.
FIG. 2C is a diagram illustrating an example of a second frame, in accordance with various aspects of the present disclosure.
FIG. 2D is a diagram illustrating an example of uplink channels within a subframe, in accordance with various aspects of the present disclosure.

FIG. 2A is a diagram 200 illustrating an example of a first subframe within a 5G NR frame structure. FIG. 2B is a diagram 230 illustrating an example of downlink channels within a 5G NR subframe. FIG. 2C is a diagram 250 illustrating an example of a second subframe within a 5G NR frame structure. FIG. 2D is a diagram 280 illustrating an example of uplink channels within a 5G NR subframe. The 5G NR frame structure may be frequency division duplexed (FDD) in which for a particular set of subcarriers (carrier system bandwidth), subframes within the set of subcarriers are dedicated for either downlink or uplink, or may be time division duplexed (TDD) in which for a particular set of subcarriers (carrier system bandwidth), subframes within the set of subcarriers are dedicated for both downlink and uplink. In the examples provided by FIGS. 2A, 2C, the 5G NR frame structure is assumed to be TDD, with subframe 4 being configured with slot format 28 (with mostly downlink), where D is downlink, U is uplink, and F is flexible for use between downlink/uplink, and subframe 3 being configured with slot format 34 (with mostly uplink). While subframes 3, 4 are shown with slot formats 34, 28, respectively, any particular subframe may be configured with any of the various available slot formats 0-61. Slot formats 0, 1 are all downlink, uplink, respectively. Other slot formats 2-61 include a mix of downlink, uplink, and flexible symbols. UEs are configured with the slot format (dynamically through downlink control information (DCI), or semi-statically/statically through RRC signaling) through a received slot format indicator (SFI). Note that the description infra applies also to a 5G NR frame structure that is TDD.

Other wireless communication technologies may have a different frame structure and/or different channels. A frame, e.g., of 10 milliseconds (ms), may be divided into 10 equally sized subframes (1 ms). Each subframe may include one or more time slots. Subframes may also include mini-slots, which may include 7, 4, or 2 symbols. Each slot may include 7 or 14 symbols, depending on the slot configuration. For slot configuration 0, each slot may include 14 symbols, and for slot configuration 1, each slot may include 7 symbols. The symbols on downlink may be cyclic prefix (CP) orthogonal frequency-division multiplexing (OFDM) (CP-OFDM) symbols. The symbols on uplink may be CP-OFDM symbols (for high throughput scenarios) or discrete Fourier transform (DFT) spread OFDM (DFT-s-OFDM) symbols (also referred to as single carrier frequency-division multiple access (SC-FDMA) symbols) (for power limited scenarios; limited to a single stream transmission). The number of slots within a subframe is based on the slot configuration and the numerology. For slot configuration 0, different numerologies $\mu$ 0 to 4 allow for 1, 2, 4, 8, and 16 slots, respectively, per subframe. For slot configuration 1, different numerologies 0 to 2 allow for 2, 4, and 8 slots, respectively, per subframe. Accordingly, for slot configuration 0 and numerology $\mu$, there are 14 symbols/slot and $2^\mu$ slots/subframe. The subcarrier spacing and symbol length/duration are a function of the numerology. The subcarrier spacing may be equal to $2^\mu*15$ kilohertz (kHz), where $\mu$ is the numerology 0 to 4. As such, the numerology $\mu=0$ has a subcarrier spacing of 15 kHz and the numerology $\mu=4$ has a subcarrier spacing of 240 kHz. The symbol length/duration is inversely related to the subcarrier spacing. FIGS. 2A-2D provide an example of slot configuration 0 with 14 symbols per slot and numerology $\mu=2$ with 4 slots per subframe. The slot duration is 0.25 ms, the subcarrier spacing is 60 kHz, and the symbol duration is approximately 16.67 microseconds ($\mu$s). Within a set of frames, there may be one or more different bandwidth parts (BWPs) (see FIG. 2B) that are frequency division multiplexed. Each BWP may have a particular numerology.

A resource grid may be used to represent the frame structure. Each time slot includes a resource block (RB) (also referred to as physical RBs (PRBs)) that extends 12 consecutive subcarriers. The resource grid is divided into multiple resource elements (REs). The number of bits carried by each RE depends on the modulation scheme.

As illustrated in FIG. 2A, some of the REs carry at least one pilot signal, such as a reference signal (RS), for the UE. Broadly, RSs may be used for beam training and management, tracking and positioning, channel estimation, and/or other such purposes. In some configurations, an RS may include at least one demodulation RS (DM-RS) (indicated as $R_x$ for one particular configuration, where 100x is the port number, but other DM-RS configurations are possible) and/or at least one channel state information (CSI) RS (CSI-RS) for channel estimation at the UE. In some other configurations, an RS may additionally or alternatively include at least one beam measurement (or management) RS (BRS), at least one beam refinement RS (BRRS), and/or at least one phase tracking RS (PT-RS).

FIG. 2B illustrates an example of various downlink channels within a subframe of a frame. The physical downlink control channel (PDCCH) carries DCI within one or more control channel elements (CCEs), each CCE including nine RE groups (REGs), each REG including four consecutive REs in an OFDM symbol. A PDCCH within one BWP may be referred to as a control resource set (CORESET). Additional BWPs may be located at greater and/or lower frequencies across the channel bandwidth. A primary synchronization signal (PSS) may be within symbol 2 of particular subframes of a frame. The PSS is used by a UE 104 to determine subframe/symbol timing and a physical layer identity. A secondary synchronization signal (SSS) may be within symbol 4 of particular subframes of a frame. The SSS is used by a UE to determine a physical layer cell identity group number and radio frame timing. Based on the physical layer identity and the physical layer cell identity group number, the UE can determine a physical cell identifier (PCI). Based on the PCI, the UE can determine the locations of the aforementioned DM-RS. The physical broadcast channel (PBCH), which carries a master information block (MIB), may be logically grouped with the PSS and SSS to form a synchronization signal (SS)/PBCH block (also referred to as SS block (SSB)). The MIB provides a number of RBs in the system bandwidth and a system frame number (SFN). The PDSCH carries user data, broadcast system information not transmitted through the PBCH such as system information blocks (SIBs), and paging messages.

As illustrated in FIG. 2C, some of the REs carry DM-RS (indicated as R for one particular configuration, but other DM-RS configurations are possible) for channel estimation at the base station. The UE may transmit DM-RS for the PUCCH and DM-RS for the physical uplink shared channel (PUSCH). The PUSCH DM-RS may be transmitted in the first one or two symbols of the PUSCH. The PUCCH DM-RS may be transmitted in different configurations depending on whether short or long PUCCHs are transmitted and depending on the particular PUCCH format used. The UE may transmit sounding reference signals (SRS). The SRS may be transmitted in the last symbol of a subframe. The SRS may have a comb structure, and a UE may transmit SRS on one of the combs. The SRS may be used by a base station for channel quality estimation to enable frequency-dependent scheduling on the uplink.

FIG. 2D illustrates an example of various uplink channels within a subframe of a frame. The PUCCH may be located as indicated in one configuration. The PUCCH carries uplink control information (UCI), which may include a scheduling request (SR), a channel quality indicator (CQI), a precoding matrix indicator (PMI), a rank indicator (RI), and HARQ ACK/NACK feedback. The PUSCH carries data, and may additionally be used to carry a buffer status report (BSR), a power headroom report (PHR), and/or UCI.

Figure 3:
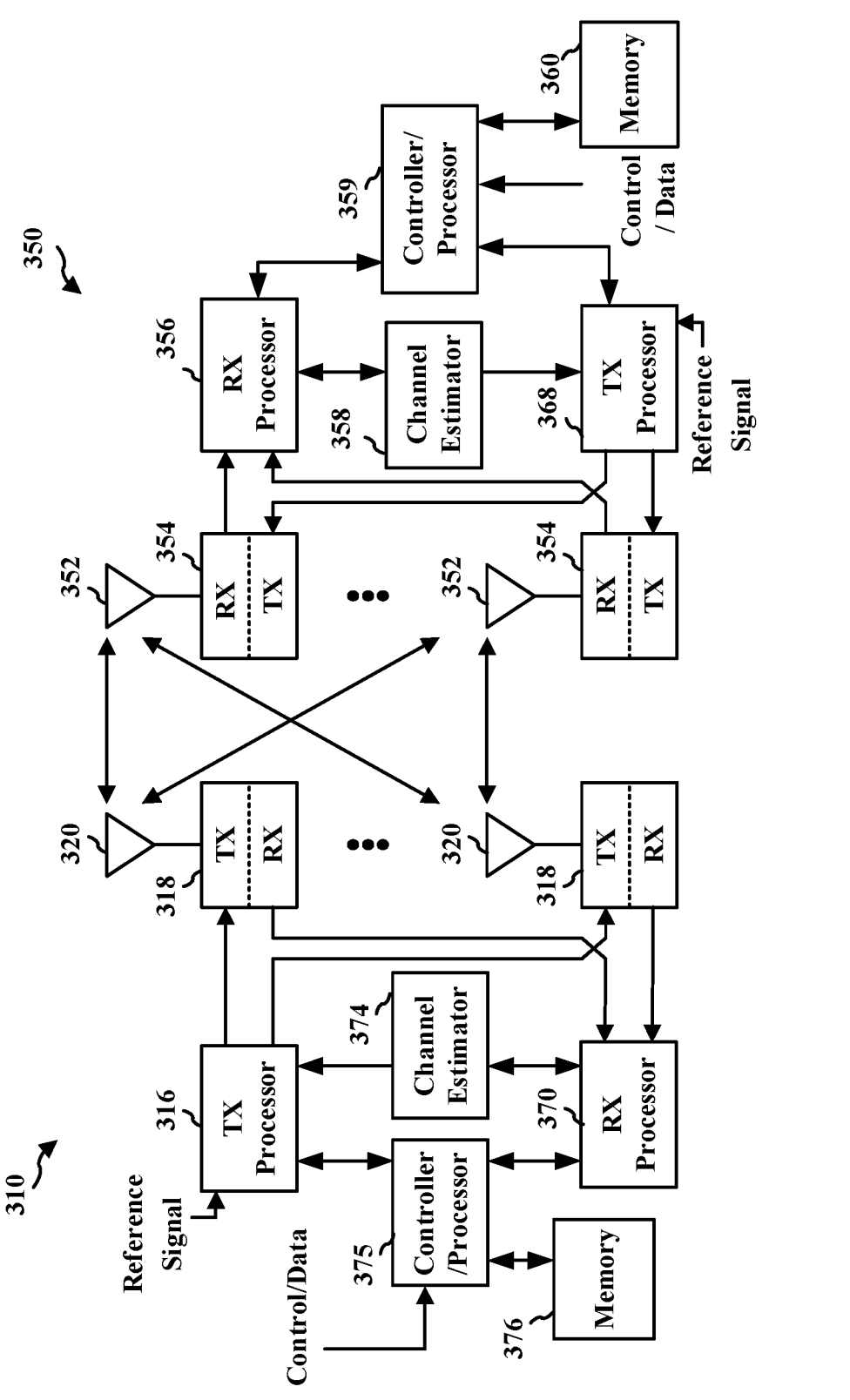
FIG. 3 is a diagram illustrating an example of a base station and user equipment (UE) in an access network.

FIG. 3 is a block diagram of a base station 310 in communication with a UE 350 in an access network. In the downlink, IP packets from the EPC 160 may be provided to a controller/processor 375. The controller/processor 375 implements Layer 2 (L2) and Layer 3 (L3) functionality. L3 includes an RRC layer, and L2 includes a service data adaptation protocol (SDAP) layer, a packet data convergence protocol (PDCP) layer, an RLC layer, and a medium access control (MAC) layer. The controller/processor 375 provides RRC layer functionality associated with broadcasting of system information (e.g., MIB, SIBs), RRC connection control (e.g., RRC connection paging, RRC connection establishment, RRC connection modification, and RRC connection release), inter radio access technology (RAT) mobility, and measurement configuration for UE measurement reporting; PDCP layer functionality associated with header compression/decompression, security (ciphering, deciphering, integrity protection, integrity verification), and handover support functions; RLC layer functionality associated with the transfer of upper layer PDUs (PDUs may additionally or alternatively refer to "packet data units"), error correction through ARQ, concatenation, segmentation, and reassembly of RLC service data units (SDUs), re-segmentation of RLC data PDUs, and reordering of RLC data PDUs; and MAC layer functionality associated with mapping between logical channels and transport channels, multiplexing of MAC SDUs onto transport blocks (TBs), demultiplexing of MAC SDUs from TBs, scheduling information reporting, error correction through HARQ, priority handling, and logical channel prioritization.

The TX processor 316 and the RX processor 370 implement Layer 1 (L1) functionality associated with various signal processing functions. L1, which includes a physical (PHY) layer, may include error detection on the transport channels, forward error correction (FEC) coding/decoding of the transport channels, interleaving, rate matching, mapping onto physical channels, modulation/demodulation of physical channels, and MIMO antenna processing. The TX processor 316 handles mapping to signal constellations based on various modulation schemes (e.g., binary phase-shift keying (BPSK), quadrature phase-shift keying (QPSK), M-phase-shift keying (M-PSK), M-quadrature amplitude modulation (M-QAM)). The coded and modulated symbols may then be split into parallel streams. Each stream may then be mapped to an OFDM subcarrier, multiplexed with a reference signal (e.g., pilot) in the time and/or frequency domain, and then combined together using an Inverse Fast Fourier Transform (IFFT) to produce a physical channel carrying a time domain OFDM symbol stream. The OFDM stream is spatially precoded to produce multiple spatial streams. Channel estimates from a channel estimator 374 may be used to determine the coding and modulation scheme, as well as for spatial processing. The channel estimate may be derived from a reference signal and/or channel condition feedback transmitted by the UE 350. Each spatial stream may then be provided to a different antenna 320 via a separate transmitter 318TX. Each transmitter 318TX may modulate a radio frequency (RF) carrier with a respective spatial stream for transmission.

At the UE 350, each receiver 354RX receives a signal through at least one respective antenna 352. Each receiver 354RX recovers information modulated onto an RF carrier and provides the information to the RX processor 356. The TX processor 368 and the RX processor 356 implement L1 functionality associated with various signal processing functions. The RX processor 356 may perform spatial processing on the information to recover any spatial streams destined for the UE 350. If multiple spatial streams are destined for the UE 350, they may be combined by the RX processor 356 into a single OFDM symbol stream. The RX processor 356 then converts the OFDM symbol stream from the time-domain to the frequency domain using a Fast Fourier Transform (FFT). The frequency domain signal comprises a separate OFDM symbol stream for each subcarrier of the OFDM signal. The symbols on each subcarrier, and the reference signal, are recovered and demodulated by determining the most likely signal constellation points transmitted by the base station 310. These soft decisions may be based on channel estimates computed by the channel estimator 358. The soft decisions are then decoded and deinterleaved to recover the data and control signals that were originally transmitted by the base station 310 on the physical channel. The data and control signals are then provided to the controller/processor 359, which implements L3 and L2 functionality.

The controller/processor 359 can be associated with a memory 360 that stores program codes and data. The memory 360 may be referred to as a computer-readable medium. In the uplink, the controller/processor 359 provides demultiplexing between transport and logical channels, packet reassembly, deciphering, header decompression, and control signal processing to recover IP packets from the EPC 160. The controller/processor 359 is also responsible for error detection using an ACK and/or NACK protocol to support HARQ operations.

Similar to the functionality described in connection with the downlink transmission by the base station 310, the controller/processor 359 provides RRC layer functionality associated with system information (e.g., MIB, SIBs) acquisition, RRC connections, and measurement reporting; PDCP layer functionality associated with header compression/decompression, and security (ciphering, deciphering, integrity protection, integrity verification); RLC layer functionality associated with the transfer of upper layer PDUs, error correction through ARQ, concatenation, segmentation, and reassembly of RLC SDUs, re-segmentation of RLC data PDUs, and reordering of RLC data PDUs; and MAC layer functionality associated with mapping between logical channels and transport channels, multiplexing of MAC SDUs onto TBs, demultiplexing of MAC SDUs from TBs, scheduling information reporting, error correction through HARQ, priority handling, and logical channel prioritization.

Channel estimates derived by a channel estimator 358 from a reference signal or feedback transmitted by the base station 310 may be used by the TX processor 368 to select the appropriate coding and modulation schemes, and to facilitate spatial processing. The spatial streams generated by the TX processor 368 may be provided to different antenna 352 via separate transmitters 354TX. Each transmitter 354TX may modulate an RF carrier with a respective spatial stream for transmission.

The uplink transmission is processed at the base station 310 in a manner similar to that described in connection with the receiver function at the UE 350. Each receiver 318RX receives a signal through at least one respective antenna 320. Each receiver 318RX recovers information modulated onto an RF carrier and provides the information to a RX processor 370.

The controller/processor 375 can be associated with a memory 376 that stores program codes and data. The memory 376 may be referred to as a computer-readable medium. In the uplink, the controller/processor 375 provides demultiplexing between transport and logical channels, packet reassembly, deciphering, header decompression, control signal processing to recover IP packets from the UE 350. IP packets from the controller/processor 375 may be provided to the EPC 160. The controller/processor 375 is also responsible for error detection using an ACK and/or NACK protocol to support HARQ operations.

In some aspects, at least one of the TX processor 368, the RX processor 356, and the controller/processor 359 may be configured to perform aspects in connection with transmission, to the base station 310, of at least one repetition of feedback (198) corresponding to a transmission from the base station 310, as described in connection with of FIG. 1, supra.

In some other aspects, at least one of the TX processor 316, the RX processor 370, and the controller/processor 375 may be configured to perform aspects in connection with reception, from the UE 350, of at least one repetition of feedback (198) corresponding to a transmission from the base station 310, as described in connection with of FIG. 1, supra.

Figure 4:
FIG. 4 is a diagram illustrating an example implementation of error control and/or correction using feedback from a UE to a base station.

FIG. 4 is a diagram 400 illustrating an example implementation of error control and/or correction using feedback from a UE 404 to a base station 402. FIG. 4 illustrates base station 402 communicating with UE 404 in an access network 482. In the context of FIGS. 1 and 3, UE 404 may be implemented as UE 104 and/or UE 350, base station 402 may be implemented as base station 102/180 and/or base station 310, and access network 428 may include one or more geographic coverage areas 110/110' (e.g., cells and/or small cells) provided by one or more base stations (including coverage area 110 of base station 102/180). In an aspect of the present disclosure, the communication links (e.g. communication links 120 shown in FIG. 1) between base station 402 and UE 404 may use MIMO antenna technology and/or multiple user MIMO (MU-MIMO) technology, which may include spatial multiplexing, beamforming, time division transmissions (e.g., Time Division Multiple Access (TDMA) techniques) and/or transmit diversity.

When UE 404 registers with base station 402, in an aspect of the present disclosure, one or more of the UE 404 and the base station 402 may determine which channels, antenna beams, spatial multiplexing schemes, etc. are to be used as communications links between base station 402 and UE 404. In an aspect of the present disclosure, in a beamforming and/or beam diversity system (i.e., where an antenna beam is formed and then switched to a second beam on the same and/or other channel and/or frequency for communication), base station 402 and/or UE 404 may also determine alternative communications links on one or more alternative antenna beams. Such a determination may be based, at least in part, on a signal-to-noise ratio (SNR) measurement of a given beam, an signal-to-interference-plus-noise ratio (SINR) measurement for a given beam, a signal-to-interference ratio (SIR) measurement of a given beam, a reference signal receive power (RSRP) measurement, a reference signal receive quality (RSRQ) measurement, and/or other factors.

In an aspect of the present disclosure, the communications links between base station 402 and UE 404 may have a desired and/or required error rate. For example, and not by way of limitation, a maximum bit error rate (BER) and/or packet error rate (PER) may be determined for a given communications link. Examples of where maximum BER and/or PER may be configured as URLLC links, IIoT links, and/or another type of communication link expected to meet certain use case parameters. For such communications links, BER and/or PER levels may be defined as one error in one hundred thousand bits/packets ($1 \times 10^{-5}$), one error in one million bits/packets ($1 \times 10^{-6}$), etc.

Base station 402 may send a semi-persistent scheduling (SPS) message on the PDSCH to UE 404. The SPS message may be in the form of one or more packets. The SPS message may be sent to UE 404 by more than one antenna, e.g., in a MIMO system, and/or may be sent by more than one beam from base station 402 to UE 404.

As shown in FIG. 4, within a cycle 440, base station 402 may send SPS packet sequence number 0 (SN0) 420 to UE 404 on PDSCH beam 1 (B1) 410, which may refer to a downlink TX beam of base station 402 that is paired with a downlink RX beam of UE 404. Contemporaneously, and/or subsequently, base station 402 may send SPS packet SN0 422 to UE 404 on PDSCH beam 2 (B2) 412. SPS packet SN0 420 and SPS packet SN0 422 may be identical, and the repetition of SPS packet SN0 420, 422 may increase the reliability of the communications between base station 402 and UE 404, because UE 404 is provided with multiple opportunities to find and decode the information carried in SPS packet SN0 420, 422. The SPS configuration sent by base station 402 to UE 404 may indicate multiple grants respectively configuring multiple resource allocations dedicated to repetitions of the initial NACK message.

Upon receiving and successfully decoding SPS packets SN0 420, 422 from base station 402, UE 404 may send an ACK message 424 to base station 402 to indicate that UE 404 has received and successfully decoded SPS packets SN0 420, 422 from base station 402, e.g., at the MAC layer or other L2 layer implementing HARQ. ACK message 424 may be sent on one or more time and/or frequency resources of PUCCH. In an aspect of the present disclosure, ACK message 424 may be sent on the PUCCH via one of the beams used by base station 402 to deliver packets 420, 422 to UE 404. For example, PUCCH B2 414 may correspond to PDSCH B2 412 according to beam reciprocity, with PUCCH B2 414 referring to an uplink RX beam of base station 402 that is paired with a downlink TX beam of UE 404.

In some aspects, ACK message 424 may be sent after the last packet 420, 422 sent in a cycle 440. In an aspect, ACK message 424 may be sent on the PUCCH via the beam link on which UE 404 received one of the SPS packets SN0 420, 422—e.g., UE 404 may transmit ACK 424 on PUCCH B2 414 based on receiving SPS packet SN0 from base station 402 via PDSCH B2 412 according to beam reciprocity, as shown in FIG. 4.

As receiving/decoding of SPS packet SN0 420, 422 was acknowledged as received by UE 404 via ACK message 424, base station 402 may send SPS packet SN1 426, again using PDSCH B1 410 and PDSCH B2 412. Because one of SPS packet SN0 420, 422 was correctly received and acknowledged by UE 404, base station 402 "knows" that PDSCH B1 410 and/or PDSCH B2 412 are suitable downlink communications links for communicating with UE 404. For example, base station 402 also "knows" that PUCCH B2 414 is a suitable communications link for UE 404, as base station 402 received ACK message 424 on PUCCH B2 414.

In the next cycle 442, since communications between base station 402 and UE 404 on PDSCH B1 410, PDSCH B2 412, and PUCCH B2 414 were suitable, base station 402 may continue to send the next SPS packet SN1 426 on PDSCH B1 420 and SPS packet SN1 428 on PDSCH B2 412. Base station 402 can "expect" UE 404 to send ACK message 430 on PUCCH B2 414. In some aspects, the communications links established between base station 402 and UE 404, i.e., PDSCH B1 410, PDSCH B2 412, and PUCCH B2 414, may be used so long as SPS packets are correctly received and acknowledged by UE 404.

Potentially, ACK/NACK feedback may be prevented from being transmitted by UE 404 and/or received by base station 402. Accordingly, there exists a need to improve the reliability of ACK/NACK feedback transmitted by a UE to a base station, e.g., in URLLC and/or other applications.

In a first example, interference and/or blockage may arise that interrupts and/or degrades one or more of the communications links between base station 402 and UE 404. For example, one or more of the downlink beams may be blocked and/or obscured by an obstacle, e.g., automobile, person, building, UE 404 may have moved position, etc., to the point where PDSCH B1 410 and/or PDSCH B2 412 can no longer adequately deliver information to UE 404.

In a second example, PUCCH B2 414 may also be blocked and or interfered with to the point that ACK message 424 (and/or ACK message 430) is not properly received at base station 402. In such an aspect, base station 402 may interpret non-receipt of ACK message 424/430 as UE 404 operating in a discontinuous transmission (DTX) mode in which UE 404 is configured to refrain from transmitting.

In a third example, signal fading, e.g., frequency selective fading, may also interfere with the communications links between base station 402 and UE 404. In the case of uplink interference (e.g., on PUCCH B2 414), an ACK message 424/430 may be misinterpreted by base station 402 as a NACK message, indicating to base station 402 that UE 404 has not received one or more SPS packets, when in fact UE 404 has received the SPS packets in question.

One or more of the preceding examples may be addressed through aspects described herein, such as aspects described in connection with FIGS. 5-9. In particular, aspects of the present disclosure provide improving the reliability of ACK/NACK feedback through one or more retransmissions of an initial NACK message on resources dedicated to NACK feedback.

Figure 5:
FIG. 5 is a diagram illustrating another example implementation of error control and/or correction using acknowledgement (ACK)/non-ACK (HACK) feedback from a UE to a base station.

FIG. 5 is a diagram 500 illustrating another example implementation of error control and/or correction using ACK/NACK feedback from UE 404 to base station 402. Diagram 500 illustrates a communications protocol in accordance with an aspect of the present disclosure. As described with respect to FIG. 4, base station 402 transmits SPS packets SN0 420, 422 during cycle 440. UE 404 acknowledges receipt of SPS packets SN0 420, 422 via ACK message 424.

Between cycle 440 and cycle 442, interference 550 blocks SPS packets SN1 426, 428 from being received/decoded at UE 404. Interference 550 may be caused by, inter alia, interference on PDSCH B1 410 and/or PDSCH B2 412, slow fading of the signals used for PDSCH B1 410 and/or PDSCH B2 412, a physical obstruction between the antenna(s) of base station 402 and the antenna(s) of UE 404, and/or other reasons.

Because UE 404 has not received/properly decoded SPS packets SN1 426, 428, UE 404 sends a NACK message 504 to base station 402. In some aspects, UE 404 not only sends NACK message 504 on PUCCH B2 414 (which is where UE 404 sent the ACK message 424 in cycle 440), UE 404 also sends NACK message 504 via one or more other beam links (e.g., an uplink beam link corresponding to B1 410 according to beam reciprocity) to ensure that base station 402 receives the NACK message 504. For example, and not by way of limitation, UE 404 may send NACK message 504 on the PUCCH via an uplink beam link that corresponds with PDSCH B1 410, such as PUCCH B1 510.

In another aspect, UE 404 may also send NACK message 504 on other beams to further ensure that base station 402 receives NACK message 504. Such PUCCH transmissions via other beams may be used for secondary, alternative, and/or emergency communications between base station 402 and UE 404 and may be earlier determined by UE 404 and base station 402, such as through the use of DCI and/or other means (e.g., a candidate beam list including other or alternative beams may be configured by base station 402 and/or UE 404). One or more beam links may be determined as secondary and/or alternative communications links between UE 404 and base station 402. Such transmissions by UE 404 may be done sequentially and/or simultaneously, and/or may be done in a determined sequence, without departing from the scope of the present disclosure.

As such, UE 404 may send NACK message 504 on PUCCH B3 512 and PUCCH B4 514 (and/or other beams carrying PUCCH transmissions) to ensure that base station 402 receives NACK message 504.

Once base station 402 receives NACK message 504, base station 402 may also use the communications links that were earlier established via DCI (or other means, such as RRC signaling and/or MAC control element (CE)) with UE 404. In some aspects, base station 402, upon receipt of NACK message 504 on the PUCCH, may determine at least one beam via which NACK message 504 was received, and retransmit SPS packet SN1 on the PDSCH via a downlink beam link corresponding to the uplink beam link via which NACK message 504 was received on the PUCCH. For example, and not by way of limitation, base station 402 may determine that NACK message 504 was received on PUCCH B3 512. Base station 402 may then retransmit SPS packet 426 on PDSCH B3 516, where PDSCH B3 516 is the downlink beam that corresponds with the uplink beam of PUCCH B3 512, e.g., according to beam reciprocity.

In order to maintain repetition of SPS packet transmission, base station 402 may also transmit SPS packet SN1 426 on another downlink beam to ensure that SPS packet SN1 426 is received at UE 404. As shown in FIG. 5, base station 402 may transmit SPS packet SN1 426 on PDSCH B4 518.

In some aspects, base station 402 may also switch to the secondary beam(s) for transmission to UE 404 once a NACK message 504 is received.

When base station 402 changes downlink beams and/or UE 404 sends a NACK message 504, access network 482 (e.g., base station 402) may re-allocate network resources to allow UE 404 and base station 402 new communications links. As such, access network 482 may also change the resources being used by other UE(s) and/or base station(s) in access network 482 to accommodate the changed network conditions. This may be done through DCI and/or other means in access network 482.

In some aspects, base station 402 and/or UE 404 (and/or another network entity of access network 482), may have predetermined a pattern of PUCCH beams to retransmit an initial NACK message if an SPS packet is not received at UE 404. In some aspects, base station 402 may also follow the same order of PDSCH beams when retransmitting SPS packets to UE 404.

When UE 404 receives SPS packet SN1 426, on PDSCH B3 516 and/or PDSCH B4 518, UE 404 can send ACK message 424 on the PUCCH via one or more beams to base station 402. In some aspects, UE 404 may send ACK message on PUCCH B3 512, although PUCCH B4 514 and/or other beams may be used for PUCCH transmissions without departing from the scope of the present disclosure.

Once base station 402 receives ACK message 424, In some aspects, new primary communications links may be established between base station 402 and UE 404. As shown in FIG. 5, for example, PDSCH B3 516 and PDSCH B4 518 may be the new primary (e.g., active or serving) downlink beams (where multiple downlink beams may be used for redundancy in access network 482). PUCCH B3 512 and PUCCH B4 514 may be the new uplink beams (again, where multiple uplink beams may be used for redundancy in access network 482).

Although described with respect to uplink/downlink beams, the redundancy and/or changes made in access network 482 to overcome interference 550, and/or to provide redundancy in the communications links between base station 402 and UE 404 may be performed in other ways. For example, and not by way of limitation, a spatial difference, a time difference, and/or a combination of frequency, spatial, and/or time differences, may be used to provide redundancy and/or adjustments to the secondary communications links without departing from the scope of the present disclosure.

In some aspects, UE resources, e.g., beams, may also be allocated to various functions for the communications links between UE 404 and base station 402. For example, and not by way of limitation, as shown in FIG. 5, PUCCH B2 414 may be allocated to UE 404 to provide both ACK message 424 and NACK message 504. Further, other resources, such as PUCCH B1 510, PUCCH B3 512, and PUCCH B4 514 may be allocated to only transmit NACK message 504. In such an aspect, PUCCH B1 510, PUCCH B3 512, and PUCCH B4 514 may be used by other UE 104 and/or base station 402 for other purposes within access network 482.

Further, within each PUCCH that may be used by UE 404, different sub-bands may be employed by UE 404 to transmit the various messages. For example, and not by way of limitation, UE 404 may use sub-band 1 of PUCCH B2 414 to transmit ACK message 424 and NACK message 504. However, when UE 404 uses a different PUCCH, e.g., PUCCH B3 512, UE 404 may transmit in sub-band 3 of PUCCH B3 512 instead of sub-band 1. Such allocation of resources may be done by the PUCCH resource indicator (PRI) in access network 482.

In some aspects, base station 402 may primarily monitor only some PUCCH based on the PRI allocations. For example, and not by way of limitation, base station 402 may only monitor PUCCH B2 414 to determine if UE 404 has transmitted ACK message 424 or NACK message 504. If ACK message 424 is received, base station 402 may not need to monitor other PRI resources, e.g., PUCCH B1 510, PUCCH B3 512, and/or PUCCH B4 514, because UE 404 will not be transmitting any messages on those PUCCH beams.

Base station 402 may not receive an ACK message 424 on PUCCH B2 414, i.e., a DTX event may occur between base station 402 and UE 404. Base station 402 may interpret a DTX event as the same as base station 402 receiving a NACK message 504 from UE 404. In such a scenario, base station 402 may then begin to monitor PRI 2, 3, 4, etc., e.g., PUCCH B1 510, PUCCH B3 512, and/or PUCCH B4 514 to maintain/re-establish communication with UE 404.

When base station 402 switches to monitoring secondary PRI resources, e.g., PUCCH B1 510, PUCCH B3 512, and/PUCCH B4 514, base station 402 is only looking for a NACK message 504. To ensure receipt of a NACK message 504, base station 402 may change the base station 402 receiver sensitivity threshold to a lower value to ensure receipt of the NACK message 504. Although changing base station 402 receiver sensitivity to a lower threshold may eventually lead to a higher false alarm probability, i.e., receiving an ACK message 424 and interpreting it as a NACK message 504.

To reduce the potential of a false alarm, In some aspects, base station 402 may require that NACK message 504 be received in more than one, and/or more than a predetermined percentage of the PRI resources used in the communication links between base station 402 and UE 404. For example, and not by way of limitation, in cycle 442 shown in FIG. 5, base station 402 may wait until NACK message 504 is received on at least two PUCCH beams, e.g., PUCCH B3 512 and PUCCH B4 514, before retransmitting SPS packet SN1 426 on PDSCH B3 516 and/or PDSCH B4 518.

In some aspects, base station 402 may monitor PRI 1 (i.e., PUCCH B2 414), and if ACK message 424 is received and/or decoded at base station 402, base station 402 may not monitor and/or decode the remaining PRIs (i.e., PUCCH B1 510, PUCCH B3 512, and PUCCH B4 514). However, base station may monitor the remaining PRIs based on other factors, e.g., RSRP, RSRQ, SINR, SNR, and/or SIR corresponding to PUCCH B2 414, and/or other signal characteristics or factors. If base station 402 receives NACK message from UE 404 on PUCCH B2 414 (PRI 1), base station 402 may begin to monitor one or more other PRIs, e.g., PUCCH B1 510, etc., and/or monitor all other PRIs, until NACK message 504 is received by base station 402.

In some aspects, although the access network 482 resources may be available to base station 402 and UE 404, e.g., PUCCH B1 510, PUCCH B3 512, PUCCH B4 514, PDSCH B3 516, and PDSCH B4 518, such resources may not be allocated to base station 402 and UE 404 for continuous use. As such, these resources may be allocated to base station 402 and UE 404 for communication upon the occurrence of a given event, anticipation of a given event, and/or determination of an upcoming event.

For example, and not by way of limitation, UE 404 and/or base station 402 may measure signal characteristics of the communications links. UE 404 may measure value(s) corresponding to PDSCH B1 410 and/or PDSCH B2 412 based on RSs respectively received thereon, and/or base station 402 may measure measurement values corresponding to PUCCH B2 414 for certain characteristics, e.g., RSRP, RSRQ, SINR, SNR, SIR, and/or other signal characteristics, based on RSs received thereon.

If one or more of the measured characteristics changes and/or falls outside of a predetermined range, e.g., measured SINR falls below a certain threshold level, measured SNR begins to change, etc., UE 404 may report (e.g., via CSI based on CSI-RSs) that one of the communications links between UE 404 and base station 402 is degrading. Base station 402 or another entity of access network 482 may then adapt the communications links between base station 402 and UE 404 upon an anticipated NACK message 504 rather than waiting for an actual NACK message 504 being received. Other feedback and/or modifications to the communications links may also be used, e.g., enhanced HARQ feedback from UE 404 to base station 402, modulation and coding scheme (MCS) changes, and/or other conditions, without departing from the scope of the present disclosure.

Further, the amount of additional resources (PRIs) that may be activated/allocated to base station 402/UE 404 may be based on one or more conditions measured and/or determined in the communications links between base station 402/UE 404.

There may also be situations where UE 404 and base station 402 cannot determine, by themselves, which PDSCH and/or PUCCH beams/channels may be used in transition to maintain communications between UE 404 and base station 402. For example, if the uplink SINR measured at base station 402 is below a certain threshold, access network 482 may be employed to reassign a PUCCH via radio resource control (RRC) protocols to avoid using PUCCH channels/sub-channels used by other UE 104 in access network 482. The SPS configuration may also be employed to determine which resources may be allocated to the communications links between base station 402 and UE 404; however, SPS configuration may only be reassigned/allocated by RRC protocols within access network 482 rather than base station 402/UE 404.

When an event occurs, and/or is anticipated and/or determined by access network 482, UE 404, and/or base station 402, the resources to maintain communications links between UE 404 and base station 402 may be allocated. The number of resources allocated may depend on the event, anticipated event, and/or determined event. For example, if the uplink SINR is measured at a level below a desired threshold level, a larger number of additional resources may be allocated; if the downlink SINR is fading, a smaller number of additional resources may be allocated.

In some aspects, a code allocation, such as a shared orthogonal cover code (OCC) allocation, for the newly-allocated resources may also be allocated. For example, an OCC length 2 may be allocated for the first newly allocated resource (PRI III, PUCCH B3 512), OCC length 4 for the second newly allocated resource (PRI IV, PUCCH B4 514), etc. Allocations of resources and/or OCC lengths may also be based on the PUCCH format as desired.

FIG. 6 is a flowchart 600 of a method of wireless communication. The method may be performed by or at a UE (e.g., the UE 104, 350), another wireless communications apparatus (e.g., the apparatus 802), or one or more components thereof. According to various different aspects, one or more of the illustrated blocks may be omitted, transposed, and/or contemporaneously performed.

At 602, a UE receives, from a network and/or base station, at least one first resource allocation dedicated to either ACK or NACK transmissions and at least one second resource allocation dedicated only to NACK transmissions. For example, referring to FIGS. 4-5, UE 404 receives, from base station 402 or other component of access network 482, at least one first resource allocation, e.g., PUCCH B2 414, dedicated to either ACK or NACK transmissions and at least one second resource allocation, e.g., PUCCH B1 510, dedicated only to NACK transmissions. For example, referring to FIG. 8, 602 may be performed by reception component 830 described with respect to FIG. 8.

At 604, the UE performs one or more measurements to the network, transmits the values of the measurements to the base station, and receives information associated with the at least one repetition of the initial NACK message from the network based on transmitting the one or more measurements. In some aspects, the UE may obtain some or all of the measurements based on receiving RSs from the base station, and measuring values upon receiving those RSs. For example, referring to FIGS. 4-5, UE 404 receives DCI from base station 402 indicating to UE 404 which of the one or more measurements to perform, and base thereon, the UE may measure one or more measurement values corresponding to each of PDSCH B1 410, B2 412, B3 516, and/or B4 518 upon receiving a respective set of RSs (e.g., CSI-RSs) via the corresponding beam. The one or more measurements can include, for example, a RSRP measurement, a RSRQ measurement, a SINR measurement, a SNR measurement, a SIR measurement, a reference signal strength indicator (RSSI) measurement, a CQI measurement, or any combination thereof. The UE may transmit the set of measurement values to the base station, and the UE may receive information configuring repetition(s) of NACK feedback based on the transmitted set of measurement values.

For example, referring to FIGS. 4-5, UE 404 may measure characteristics of the communications links. UE 404 may measure value(s) corresponding to PDSCH B1 410 and/or PDSCH B2 412 based on RSs respectively received thereon. For example, referring to FIG. 8, 604 may be performed by transmission component 834 and measurement component 842 described with respect to FIG. 8.

At 606, the UE receives DCI from the network, with the DCI indicating at least one second resource allocation to the UE for the at least one repetition of the initial NACK message. The DCI may be received prior to transmission of an initial NACK message. For example, referring to FIGS. 4-5, UE 404 receives DCI via PDCCH from base station 402 that indicates to UE 404 the PUCCH beams, e.g., PUCCH B1 510. For example, 606 may be performed by reception component 830 described with respect to FIG. 8.

At 608, the UE receives DCI that configures SPS associated with the at least one second resource allocation. In some aspects, the DCI may reconfigure the at least one second resource allocation from an earlier configured resource allocation. The DCI may configure a periodicity at which SPS resources are scheduled to occur. For example, referring to FIGS. 4-5, UE 404 receives DCI via PDCCH from base station 402 that indicates, to UE 404, SPS information to be applied for encoding and transmitting HARQ feedback on resources that are scheduled to occur periodically. For example, 608 may be performed by reception component 830 described with respect to FIG. 8.

At 610, the UE receives information activating the at least one repetition of the initial NACK message, For example, referring to FIGS. 4-5, UE 404 receives SPS packet 420 from base station 402 that configures UE 404 to transmit at least one repetition of an initial NACK message 504. For example, 610 may be performed by reception component 830 described with respect to FIG. 8.

At 612, the UE transmits an initial NACK message to the network based on the at least one first resource allocation. In some aspects, ACK feedback may be transmitted without repetition, but NACK feedback may be transmitted with repetition. For example, referring to FIGS. 4-5, UE 404 transmits a NACK message 504 on PUCCH B2 414. For example, 612 may be performed by transmission component 834 described with respect to FIG. 8.

At 614, the UE determines whether to transmit the at least one repetition of the initial NACK message, the at least one repetition of the initial NACK message being transmitted based on the determining whether to transmit the at least one repetition of the initial NACK message. For example, referring to FIGS. 4-5, UE 404 determines whether to transmit initial NACK message 504 on PUCCH B1 510. For example, 614 may be performed by determination component 840 described with respect to FIG. 8.

At 616, the UE transmits at least one repetition of the initial NACK message based on the at least one second resource allocation. For example, referring to FIGS. 4-5, UE 404 transmits initial NACK message 504 on PUCCH B1 510. In an aspect, the at least one repetition of the initial NACK message 504 may be transmitted based on received information. In another aspect, UE 404 may determine whether to transmit the at least one repetition of the initial NACK message 504 may be based on the information associated with the at least one repetition of the initial NACK message received from the base station 402. For example, 616 may be performed by transmission component 834 described with respect to FIG. 8.

FIG. 7 is a flowchart 700 of a method of wireless communication. The method may be performed by or at a network entity, such as a base station (e.g., the base station 102/180, 310), another wireless communications apparatus (e.g., the apparatus 902), or one or more components thereof. According to various different aspects, one or more of the illustrated blocks may be omitted, transposed, and/or contemporaneously performed.

At 702, a base station transmits, to a UE, at least one first resource allocation dedicated to either ACK or NACK transmissions and at least one second resource allocation dedicated only to NACK transmissions. For example, referring to FIGS. 4-5, base station 402 transmits, to UE 404, at least one first resource allocation, e.g., PUCCH B2 414 dedicated to either ACK or NACK transmissions and at least one second resource allocation, e.g., PUCCH B1 510 dedicated only to NACK transmissions. For example, 702 may be performed by transmission component 934 described with respect to FIG. 9.

At 704, the base station may receive one or more measurements from the UE. The one or more measurements may include values for one or more of an RSRP, RSRQ, SINR, SNR, RSSI, and/or CQI. The one or more measurement values may be based on RSs transmitted by the base station to the UE. For example, referring to FIGS. 4-5, base station 402 receives, from UE 404, one or more measurements from the UE corresponding to a channel (e.g., PDSCH) on which the base station communicates with the UE 404. at least one first resource allocation, e.g., PUCCH B2 414 dedicated to either ACK or NACK transmissions and at least one second resource allocation, e.g., PUCCH B1 510 dedicated only to NACK transmissions. For example, 704 may be performed by measurement component 942 described with respect to FIG. 9.

At 706, the base station determines whether to configure the at least one second resource allocation for the at least one repetition of the initial NACK message. In some aspects, the base station may determine to configure the at least second resource allocation based on the one or more measurement values received from the UE and/or one or more measurement values measured from RSs transmitted by the UE to the base station (e.g., SRSs). The base station may compare one or more of the measurement values to a threshold, and the base station may determine to configure the at least one second resource allocation based on the comparison of the measurement values to the threshold. In some other aspects, the base station may compare a number of NACK feedback messages to a threshold, and the base station may determine to configure the at least one second resource allocation based on the comparison of the number of NACK feedback message to a threshold. For example, referring to FIGS. 4-5, base station 402 determines which PUCCH resources and/or beams, e.g., PUCCH B1 510, to configure for the at least one second resource allocation. For example, 706 may be performed by configuration component 940 described with respect to FIG. 9.

At 708, the base station transmits DCI allocating the at least one second resource allocation to the UE prior to transmitting a downlink transmission corresponding to the initial NACK message. For example, referring to FIGS. 4-5, base station 402 base station 402 transmits DCI via PDCCH that indicates to UE 404 the PUCCH resources and/or beams of the at least one second resource allocation. For example, 708 may be performed by transmission component 934 described with respect to FIG. 9.

At 710, the base station transmits DCI that reconfigures a SPS configuration associated with the at least one second resource allocation. For example, referring to FIGS. 4-5, base station 402 may transmit, to UE 404, information associated with PUCCH B1 510. For example, 710 may be performed by transmission component 934 described with respect to FIG. 9.

At 712, the base station transmits information activating the at least one repetition of the initial NACK message when the at least one second resource allocation is determined to be configured, the at least one repetition of the initial NACK message being received based on the transmitted information. For example, referring to FIGS. 4-5, base station 402 transmits DCI via PDCCH that indicates to UE 404 the PUCCH resources and/or beams, e.g., PUCCH B1 510. For example, 712 may be performed by transmission component 934 and/or described with respect to FIG. 9.

At 714, the base station receives an initial NACK message based on the at least one first resource allocation. The base station may decode resources scheduled by DCI configuring SPS and activated by DCI. The initial NACK may be the first transmitted HARQ message for a corresponding transmission to the UE. For example, referring to FIGS. 4-5, base station 402 may receive, from UE 404, an initial NACK message 504 on PUCCH B2 414. For example, 714 may be performed by reception component 930 described with respect to FIG. 9.

At 716, the base station receives at least one repetition of the initial NACK message based on the at least one second resource allocation. The base station may decode the at least one repetition on the second resource allocation when the initial HARQ feedback message indicates a NACK. The base station may refrain from decoding information on the second resource allocation when the initial HARQ transmission on the first resource allocation indicates an ACK. For example, referring to FIGS. 4-5, base station 402 may receive, from UE 404, a repetition of the initial NACK message 504 on PUCCH B1 510. For example, 716 may be performed by reception component 930 described with respect to FIG. 9.

Figure 8:
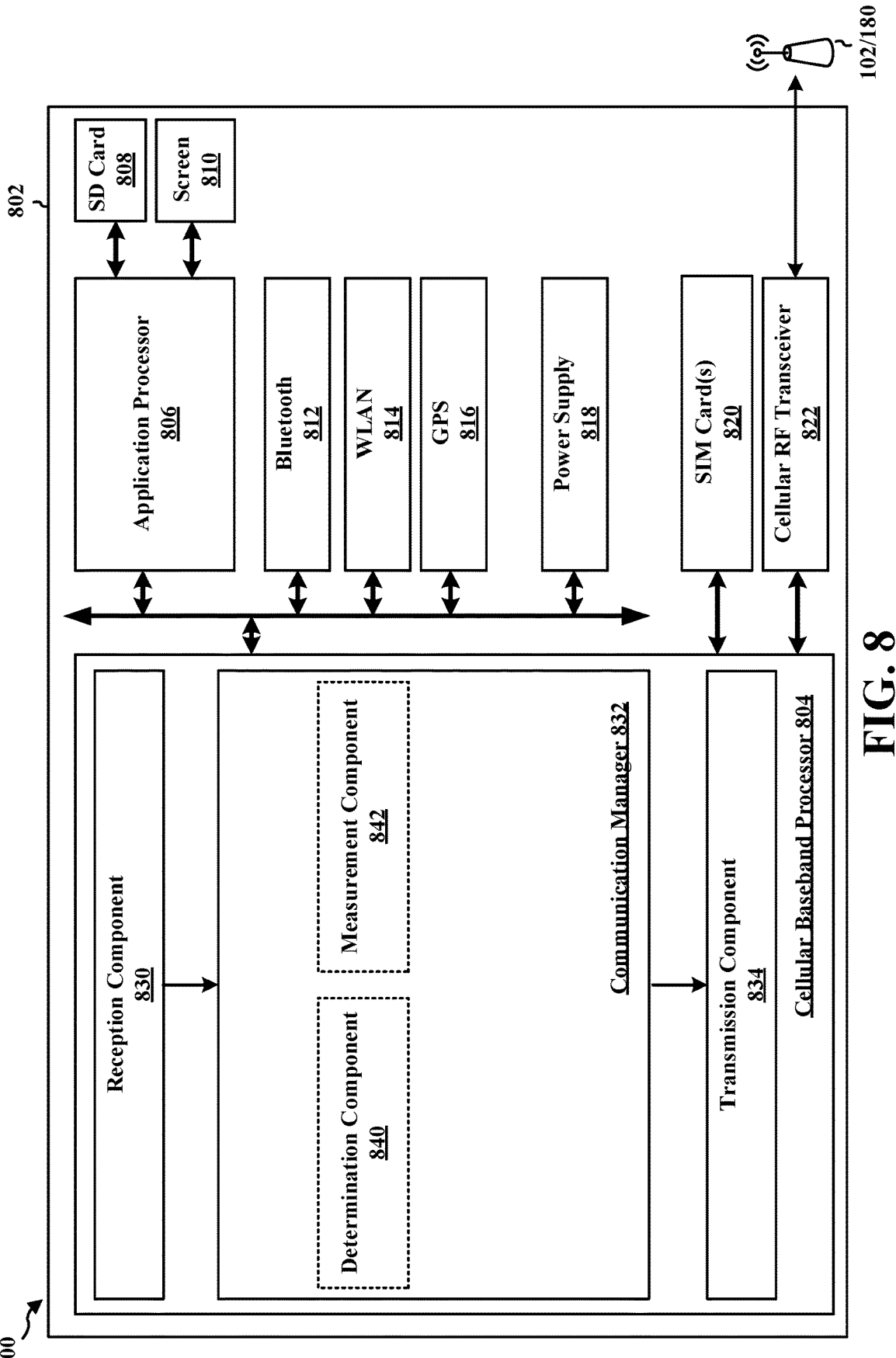
FIG. 8 is a diagram illustrating an example of a hardware implementation for an example apparatus.

FIG. 8 is a diagram 800 illustrating an example of a hardware implementation for an apparatus 802. The apparatus 802 may be a UE or similar device, or the apparatus 802 may be a component of a UE or similar device. The apparatus 802 may include a cellular baseband processor 804 (also referred to as a modem) and/or a cellular RF transceiver 822, which may be coupled together and/or integrated into the same package, component, circuit, chip, and/or other circuitry.

In some aspects, the apparatus 802 may accept or may include one or more subscriber identity modules (SIM) cards 820, which may include one or more integrated circuits, chips, or similar circuitry, and which may be removable or embedded. The one or more SIM cards 820 may carry identification and/or authentication information, such as an international mobile subscriber identity (IMSI) and/or IMSI-related key(s). Further, the apparatus 802 may include one or more of an application processor 806 coupled to a secure digital (SD) card 808 and a screen 810, a Bluetooth module 812, a wireless local area network (WLAN) module 814, a Global Positioning System (GPS) module 816, and/or a power supply 818.

The cellular baseband processor 804 communicates through the cellular RF transceiver 822 with the UE 104 and/or base station 102/180. The cellular baseband processor 804 may include a computer-readable medium/memory. The computer-readable medium/memory may be non-transitory. The cellular baseband processor 804 is responsible for general processing, including the execution of software stored on the computer-readable medium/memory. The software, when executed by the cellular baseband processor 804, causes the cellular baseband processor 804 to perform the various functions described supra. The computer-readable medium/memory may also be used for storing data that is manipulated by the cellular baseband processor 804 when executing software. The cellular baseband processor 804 further includes a reception component 830, a communication manager 832, and a transmission component 834. The communication manager 832 includes the one or more illustrated components. The components within the communication manager 832 may be stored in the computer-readable medium/memory and/or configured as hardware within the cellular baseband processor 804.

In the context of FIG. 3, the cellular baseband processor 804 may be a component of the UE 350 and may include the memory 360 and/or at least one of the TX processor 368, the RX processor 356, and/or the controller/processor 359. In one configuration, the apparatus 802 may be a modem chip and/or may be implemented as the baseband processor 804, while in another configuration, the apparatus 802 may be the entire UE (e.g., the UE 350 of FIG. 3) and may include some or all of the abovementioned components, circuits, chips, and/or other circuitry illustrated in the context of the apparatus 802. In one configuration, the cellular RF transceiver 822 may be implemented as at least one of the transmitter 354TX and/or the receiver 354RX.

The reception component 830 may be configured to receive signaling on a wireless channel, such as signaling from a base station 102/180 or UE 104. The transmission component 834 may be configured to transmit signaling on a wireless channel, such as signaling to a base station 102/180 or UE 104. The communication manager 832 may coordinate or manage some or all wireless communications by the apparatus 802, including across the reception component 830 and the transmission component 834.

The reception component 830 may provide some or all data and/or control information included in received signaling to the communication manager 832, and the communication manager 832 may generate and provide some or all of the data and/or control information to be included in transmitted signaling to the transmission component 834. The communication manager 832 may include the various illustrated components, including one or more components configured to process received data and/or control information, and/or one or more components configured to generate data and/or control information for transmission.

The communication manager 832 includes a determination component 840 that is configured to determine whether to transmit the at least one repetition of the initial NACK message, the at least one repetition of the initial NACK message being transmitted based on the determining whether to transmit the at least one repetition of the initial NACK message, as described in connection with 608 from FIG. 6.

The communication manager 832 further includes a measurement component 842 that communicates with transmission component 834 to perform one or more measurements and transmission component 834 transmits the one or more measurements to the network, and also communicates with reception component 830 to receive information associated with the at least one repetition of the initial NACK message from the network. The reception component 830 and transmission component 834 may communicate to transmit the one or more measurements. Transmission component 834 may also determine whether to transmit the at least one repetition of the initial NACK message based on the information associated with the at least one repetition of the initial NACK message received from the network, as described in connection with 610 from FIG. 6.

The apparatus 802 may include additional components that perform some or all of the blocks, operations, signaling, etc. of the algorithm(s) in the aforementioned call flow diagram and/or flowchart(s) of FIGS. 4-6. As such, some or all of the blocks, operations, signaling, etc. in the aforementioned call flow diagram(s) and/or flowchart(s) of FIGS. 4-6 may be performed by one or more components and the apparatus 802 may include one or more such components. The components may be one or more hardware components specifically configured to carry out the stated processes/algorithm, implemented by a processor configured to perform the stated processes/algorithm, stored within a computer-readable medium for implementation by a processor, or some combination thereof.

In one configuration, the apparatus 802, and in particular the cellular baseband processor 804, includes means for transmitting, to a network entity on a first set of resources, feedback including an ACK or a non-ACK corresponding to a transmission from the network entity, the feedback being transmitted without repetition when the feedback includes the ACK corresponding to the transmission; and means for transmitting, to the network entity on a second set of resources, a repetition of the feedback when the feedback includes the NACK corresponding to the transmission.

In one configuration, the apparatus 802, and in particular the cellular baseband processor 804, may further include means for receiving information indicating the first set of resources allocated for the feedback including the ACK or the NACK corresponding to the transmission; and means for receiving information indicating the second set of resources allocated for the repetition of the feedback including the NACK corresponding to the transmission.

In one configuration, means for transmitting, to the network entity on at least one third set of resources, at least one other repetition of the feedback when the feedback includes the NACK corresponding to the transmission.

In one configuration, and the repetition of the feedback is transmitted based on a set of measurement values associated with a channel on which to communicate with the network entity.

In one configuration, the apparatus 802, and in particular the cellular baseband processor 804, may further include means for transmitting, to the network entity, information indicating the set of measurement values; and means for receiving, from the network entity based on the information indicating the set of measurement values, a configuration associated with transmission of the repetition of the feedback including the NACK, and the repetition of the feedback including the NACK is transmitted based on the configuration.

In one configuration, the apparatus 802, and in particular the cellular baseband processor 804, may further include means for receiving a configuration activating the repetition of the feedback including the NACK, and the repetition of the feedback including the NACK is transmitted after reception of the configuration.

In one configuration, the apparatus 802, and in particular the cellular baseband processor 804, may further include means for receiving, from the network entity, DCI indicating a SPS configuration associated with the second set of resources, and the repetition of the feedback including the NACK is transmitted after reception of the SPS configuration.

In one configuration, the SPS configuration indicates one grant for transmission of the repetition of the feedback including the NACK on the second set of resources, and further indicates at least one other grant for transmission of at least one other repetition of the feedback including the NACK on at least one third set of resources.

In one configuration, the first set of resources and the second set of resources respectively include at least one of a set of time resources, a set of frequency resources, or a set of spatial resources, and a respective set of the spatial resources includes a beam of the network entity.

In one configuration, the first set of resources is different from the second set of resources.

The aforementioned means may be one or more of the aforementioned components of the apparatus 802 configured to perform the functions recited by the aforementioned means. As described supra, the apparatus 802 may include the TX Processor 368, the RX Processor 356, and the controller/processor 359. As such, in one configuration, the aforementioned means may be the TX Processor 368, the RX Processor 356, and the controller/processor 359 configured to perform the functions recited by the aforementioned means.

Figure 9:
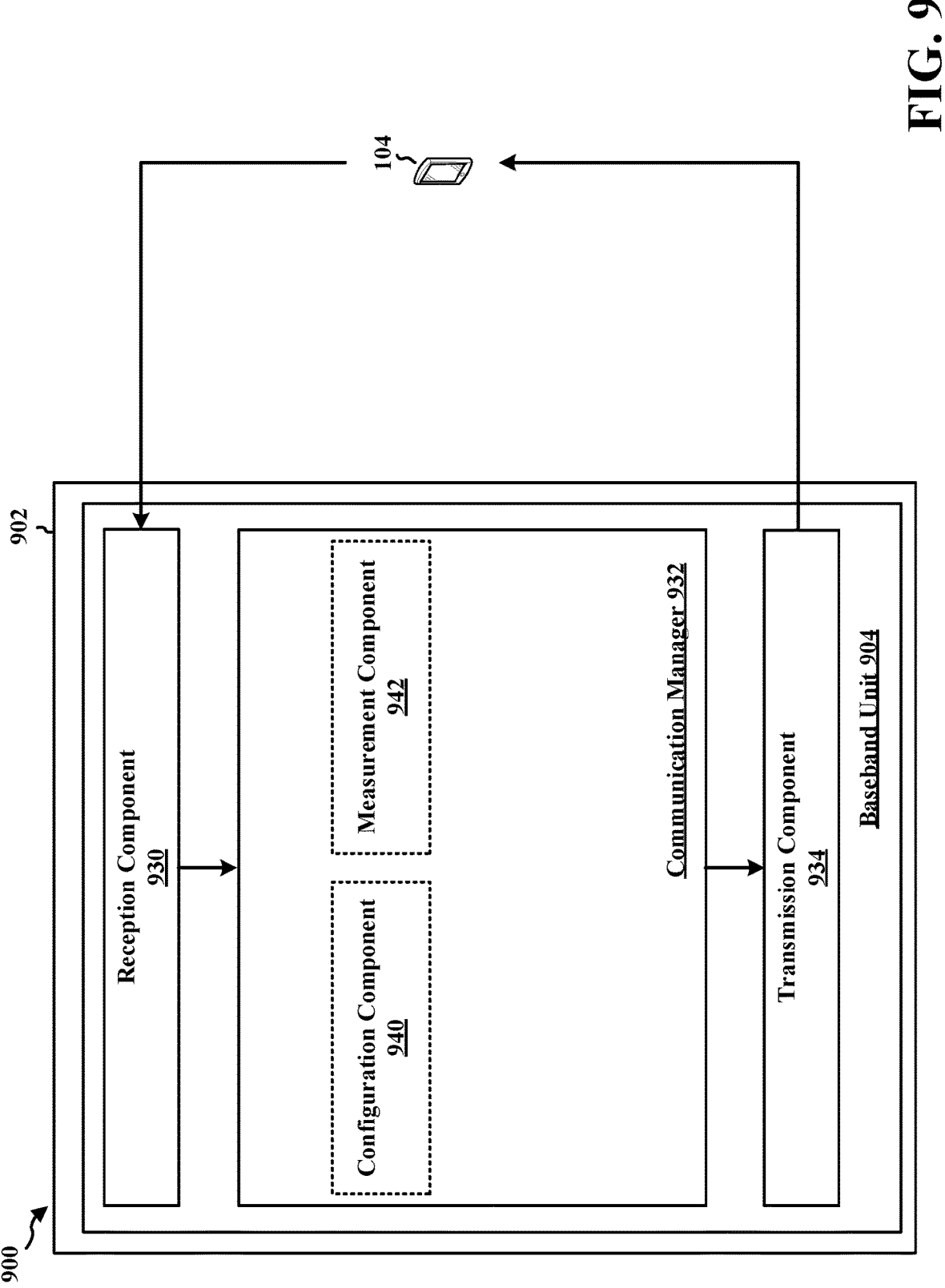
FIG. 9 is a diagram illustrating another example of a hardware implementation for another example apparatus.

FIG. 9 is a diagram 900 illustrating an example of a hardware implementation for an apparatus 902. The apparatus 902 may be a base station or similar device or system, or the apparatus 902 may be a component of a base station or similar device or system. The apparatus 902 may include a baseband unit 904. The baseband unit 904 may communicate through a cellular RF transceiver. For example, the baseband unit 904 may communicate through a cellular RF transceiver with a UE 104, such as for downlink and/or uplink communication, and/or with a base station 102/180, such as for IAB.

The baseband unit 904 may include a computer-readable medium/memory, which may be non-transitory. The baseband unit 904 is responsible for general processing, including the execution of software stored on the computer-readable medium/memory. The software, when executed by the baseband unit 904, causes the baseband unit 904 to perform the various functions described supra. The computer-readable medium/memory may also be used for storing data that is manipulated by the baseband unit 904 when executing software. The baseband unit 904 further includes a reception component 930, a communication manager 932, and a transmission component 934. The communication manager 932 includes the one or more illustrated components. The components within the communication manager 932 may be stored in the computer-readable medium/memory and/or configured as hardware within the baseband unit 904. The baseband unit 904 may be a component of the base station 310 and may include the memory 376 and/or at least one of the TX processor 316, the RX processor 370, and the controller/processor 375.

The reception component 930 may be configured to receive signaling on a wireless channel, such as signaling from a UE 104 or base station 102/180. The transmission component 934 may be configured to transmit signaling on a wireless channel, such as signaling to a UE 104 or base station 102/180. The communication manager 932 may coordinate or manage some or all wireless communications by the apparatus 902, including across the reception component 930 and the transmission component 934.

Apparatus 902 includes reception component 930 and transmission component 934, where transmission component 934 transmits, to a UE 104, at least one first resource allocation dedicated to either ACK or NACK transmissions and at least one second resource allocation dedicated only to NACK transmissions, and reception component 930 receives an initial NACK message based on the at least one first resource allocation and receives at least one repetition of the initial NACK message based on the at least one second resource allocation.

The communication manager 932 includes a configuration component 940 that determines whether to configure the at least one second resource allocation for the at least one repetition of the initial NACK message, and the at least one repetition of the initial NACK message is received when the at least one second resource allocation is determined to be configured, e.g., as described in connection with 708 of FIG. 7.

The communication manager 932 further includes a measurement component 942 that receives one or more measurements from the UE 104 for use in determining the characteristics of the communications links between UE 104 and base station 102/180, as described in connection with 710 of FIG. 7.

The reception component 930 may provide some or all data and/or control information included in received signaling to the communication manager 932, and the communication manager 932 may generate and provide some or all of the data and/or control information to be included in transmitted signaling to the transmission component 934. The communication manager 932 may include the various illustrated components, including one or more components configured to process received data and/or control information, and/or one or more components configured to generate data and/or control information for transmission. In some aspects, the generation of data and/or control information may include packetizing or otherwise reformatting data and/or control information received from a core network, such as the core network 190 or the EPC 160, for transmission.

The apparatus 902 may include additional components that perform some or all of the blocks, operations, signaling, etc. of the algorithm(s) in the aforementioned call flow diagram(s) and/or flowchart(s) of FIGS. 4, 5, and/or 7. As such, some or all of the blocks, operations, signaling, etc. in the aforementioned call flow diagram(s) and/or flowchart(s) of FIGS. 4, 5, and/or 7 may be performed by a component and the apparatus 902 may include one or more of those components. The components may be one or more hardware components specifically configured to carry out the stated processes/algorithm, implemented by a processor configured to perform the stated processes/algorithm, stored within a computer-readable medium for implementation by a processor, or some combination thereof.

In one configuration, the apparatus 902, and in particular the baseband unit 904, includes means for decoding feedback received from a UE on a first set of resources, the feedback including an ACK or a NACK corresponding to a transmission to the UE; and means for decoding a repetition of the feedback received from the UE on a second set of resources when the feedback decoded on the first set of resources includes the NACK corresponding to the transmission.

In one configuration, the apparatus 902, and in particular the baseband unit 904, further includes: means for transmitting, to the UE, information indicating the first set of resources allocated for the feedback including the ACK or the NACK corresponding to the transmission; and means for transmitting, to the UE, information indicating the second set of resources allocated for the repetition of the feedback including the NACK corresponding to the transmission.

In one configuration, the apparatus 902, and in particular the baseband unit 904, further includes: means for decoding at least one other repetition of the feedback received from the UE on at least one third set of resources when the feedback includes the NACK corresponding to the transmission.

In one configuration, the apparatus 902, and in particular the baseband unit 904, further includes: means for receiving, from the UE, information indicating a set of measurement values associated with a channel on which to communicate with the UE; and means for transmitting, to the UE based on the information indicating the set of measurement values, a configuration associated with transmission of the repetition of the feedback including the NACK, and the repetition of the feedback including the NACK is decoded based on the configuration.

In one configuration, the set of measurement values includes a value of at least one of a RSRP, a RSRQ, a SINR, a SNR, a SIR, a CQI, or a RSSI.

In one configuration, the apparatus 902, and in particular the baseband unit 904, further includes: means for transmitting, to the UE, a configuration activating the repetition of the feedback including the NACK, and the repetition of the feedback including the NACK is decoded after transmission of the configuration.

In one configuration, the apparatus 902, and in particular the baseband unit 904, further includes: means for transmitting, to the UE, DCI indicating a SPS configuration associated with the second set of resources, and the repetition of the feedback including the NACK is decoded after transmission of the SPS configuration.

In one configuration, the SPS configuration indicates one grant for transmission of the repetition of the feedback including the NACK on the second set of resources, and further indicates at least one other grant for transmission of at least one other repetition of the feedback including the NACK on at least one third set of resources.

In one configuration, the first set of resources and the second set of resources respectively include at least one of a set of time resources, a set of frequency resources, or a set of spatial resources, wherein a respective set of the spatial resources includes a beam of the network entity.

In one configuration, the first set of resources is different from the second set of resources.

In one configuration, means for refraining from decoding information on the second set of resources when the feedback decoded on the first set of resources includes the ACK corresponding to the transmission.

The aforementioned means may be one or more of the aforementioned components of the apparatus 902 configured to perform the functions recited by the aforementioned means. As described supra, the apparatus 902 may include the TX Processor 316, the RX Processor 370, and the controller/processor 375. As such, in one configuration, the aforementioned means may be the TX Processor 316, the RX Processor 370, and the controller/processor 375 configured to perform the functions recited by the aforementioned means.

The specific order or hierarchy of blocks or operations in each of the foregoing processes, flowcharts, and other diagrams disclosed herein is an illustration of example approaches. Based upon design preferences, one of ordinary skill will readily recognize that the specific order or hierarchy of blocks or operations in each of the foregoing processes, flowcharts, and other diagrams may be rearranged, omitted, and/or contemporaneously performed without departing from the scope of the present disclosure. Further, some blocks or operations may be combined or omitted. The accompanying method claims present elements of the various blocks or operations in a sample order, and are not meant to be limited to the specific order or hierarchy presented.

The following examples are illustrative only and may be combined with aspects of other embodiments or teachings described herein, without limitation.

Example 1 is a method of wireless communication at a UE, including: transmitting, to a network entity on a first set of resources, feedback including an ACK or a NACK corresponding to a transmission from the network entity, the feedback being transmitted without repetition when the feedback includes the ACK corresponding to the transmission; and transmitting, to the network entity on a second set of resources, a repetition of the feedback when the feedback includes the NACK corresponding to the transmission.

Example 2 may be the method of Example 1, further including: receiving information indicating the first set of resources allocated for the feedback including the ACK or the NACK corresponding to the transmission; and receiving information indicating the second set of resources allocated for the repetition of the feedback including the NACK corresponding to the transmission.

Example 3 may be the method of Example 1, further including: transmitting, to the network entity on at least one third set of resources, at least one other repetition of the feedback when the feedback includes the NACK corresponding to the transmission.

Example 4 may be the method of Example 1, and the repetition of the feedback is transmitted based on a set of measurement values associated with a channel on which to communicate with the network entity.

Example 5 may be the method of Example 4, and the set of measurement values includes a value of at least one of a reference signal received power (RSRP), a reference signal received quality (RSRQ), a signal-to-interference-plus-noise ratio (SINR), a signal-to-noise ratio (SNR), a signal-to-interference ratio (SIR), a channel quality indicator (CQI), or a reference signal strength indicator (RSSI).

Example 6 may be the method of Example 4, further including: transmitting, to the network entity, information indicating the set of measurement values; and receiving, from the network entity based on the information indicating the set of measurement values, a configuration associated with transmission of the repetition of the feedback including the NACK, and the repetition of the feedback including the NACK is transmitted based on the configuration.

Example 7 may be the method of Example 1, further including: receiving a configuration activating the repetition of the feedback including the NACK, and the repetition of the feedback including the NACK is transmitted after reception of the configuration.

Example 8 may be the method of Example 1, further including: receiving, from the network entity, DCI indicating a SPS configuration associated with the second set of resources, and the repetition of the feedback including the NACK is transmitted after reception of the SPS configuration.

Example 9 may be the method of Example 8, and the SPS configuration indicates one grant for transmission of the repetition of the feedback including the NACK on the second set of resources, and further indicates at least one other grant for transmission of at least one other repetition of the feedback including the NACK on at least one third set of resources.

Example 10 may be the method of Example 1, and the first set of resources and the second set of resources respectively include at least one of a set of time resources, a set of frequency resources, or a set of spatial resources, and a respective set of the spatial resources includes a beam of the network entity.

Example 11 may be the method of Example 1, and the first set of resources is different from the second set of resources.

Example 12 is a method of wireless communication at a network entity, including: decoding feedback received from a UE on a first set of resources, the feedback including an ACK or a NACK corresponding to a transmission to the UE; and decoding a repetition of the feedback received from the UE on a second set of resources when the feedback decoded on the first set of resources includes the NACK corresponding to the transmission.

Example 13 may be the method of Example 12, further including: transmitting, to the UE, information indicating the first set of resources allocated for the feedback including the ACK or the NACK corresponding to the transmission; and transmitting, to the UE, information indicating the second set of resources allocated for the repetition of the feedback including the NACK corresponding to the transmission.

Example 14 may be the method of Example 12, further including: decoding at least one other repetition of the feedback received from the UE on at least one third set of resources when the feedback includes the NACK corresponding to the transmission.

Example 15 may be the method of Example 12, further including: receiving, from the UE, information indicating a set of measurement values associated with a channel on which to communicate with the UE; and transmitting, to the UE based on the information indicating the set of measurement values, a configuration associated with transmission of the repetition of the feedback including the NACK, and the repetition of the feedback including the NACK is decoded based on the configuration.

Example 16 may be the method of Example 15, and the set of measurement values includes a value of at least one of a RSRP, a RSRQ, a SINR, a SNR, a SIR, a CQI, or a RSSI.

Example 17 may be the method of Example 12, further including: transmitting, to the UE, a configuration activating the repetition of the feedback including the NACK, and the repetition of the feedback including the NACK is decoded after transmission of the configuration.

Example 18 may be the method of Example 12, further including: transmitting, to the UE, DCI indicating a SPS configuration associated with the second set of resources, and the repetition of the feedback including the NACK is decoded after transmission of the SPS configuration.

Example 19 may be the method of Example 18, and the SPS configuration indicates one grant for transmission of the repetition of the feedback including the NACK on the second set of resources, and further indicates at least one other grant for transmission of at least one other repetition of the feedback including the NACK on at least one third set of resources.

Example 20 may be the method of Example 12, and the first set of resources and the second set of resources respectively include at least one of a set of time resources, a set of frequency resources, or a set of spatial resources, and a respective set of the spatial resources includes a beam of the network entity.

Example 21 may be the method of Example 12, and the first set of resources is different from the second set of resources.

Example 22 may be the method of Example 12, further including: refraining from decoding information on the second set of resources when the feedback decoded on the first set of resources includes the ACK corresponding to the transmission.

The previous description is provided to enable any person of ordinary skill in the art to practice the various aspects described herein. Various modifications to these aspects will be readily apparent to those having ordinary skill in the art, and the generic principles defined herein may be applied to other aspects. Thus, the claims are not intended to be limited to the aspects shown herein, but is to be accorded the full scope consistent with the language. Thus, the language employed herein is not intended to limit the scope of the claims to only those aspects shown herein, but is to be accorded the full scope consistent with the language of the claims.

As one example, the language "determining" may encompass a wide variety of actions, and so may not be limited to the concepts and aspects explicitly described or illustrated by the present disclosure. In some contexts, "determining" may include calculating, computing, processing, measuring, deriving, investigating, looking up (e.g., looking up in a table, a database or another data structure), ascertaining, resolving, selecting, choosing, establishing, and so forth. In some other contexts, "determining" may include communication and/or memory operations/procedures through which information or value(s) are acquired, such as "receiving" (e.g., receiving information), "accessing" (e.g., accessing data in a memory), "detecting," and the like.

As another example, reference to an element in the singular is not intended to mean "one and only one" unless specifically stated, but rather "one or more." Further, terms such as "if," "when," and "while" should be interpreted to mean "under the condition that" rather than imply an immediate temporal relationship or reaction. That is, these phrases, e.g., "when," do not imply an immediate action in response to or during the occurrence of an action or event, but rather imply that if a condition is met then another action or event will occur, but without requiring a specific or immediate time constraint or direct correlation for the other action or event to occur. The word "exemplary" is used herein to mean "serving as an example, instance, or illustration." Any aspect described herein as "exemplary" is not necessarily to be construed as preferred or advantageous over other aspects. Unless specifically stated otherwise, the term "some" refers to one or more. Combinations such as "at least one of A, B, or C," "one or more of A, B, or C," "at least one of A, B, and C," "one or more of A, B, and C," and "A, B, C, or any combination thereof" include any combination of A, B, and/or C, and may include multiples of A, multiples of B, or multiples of C. Specifically, combinations such as "at least one of A, B, or C," "one or more of A, B, or C," "at least one of A, B, and C," "one or more of A, B, and C," and "A, B, C, or any combination thereof" may be A only, B only, C only, A and B, A and C, B and C, or A and B and C, where any such combinations may contain one or more member or members of A, B, or C. All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. The words "module," "mechanism," "element," "device," and the like may not be a substitute for the word "means." As such, no claim element is to be construed as a means plus function unless the element is expressly recited using the phrase "means for."

What is claimed is:

1. A method of wireless communication at a user equipment (UE), comprising:

transmitting, to a network entity on a first set of resources, feedback comprising an acknowledgement (ACK) or a non-ACK (NACK) corresponding to a transmission from the network entity, the feedback being transmitted without repetition when the feedback comprises the ACK corresponding to the transmission, the first set of resources comprising a first beam corresponding to a beam link used for the transmission from the network entity; and transmitting, to the network entity on a second set of resources, a repetition of the feedback when the feedback comprises the NACK corresponding to the transmission, the second set of resources comprising a second beam different from the first beam, the second beam corresponding to a secondary beam link used for the transmission from the network entity.

2. The method of claim 1, further comprising:

receiving information indicating the first set of resources allocated for the feedback comprising the ACK or the NACK corresponding to the transmission; and receiving information indicating the second set of resources allocated for the repetition of the feedback comprising the NACK corresponding to the transmission.

3. The method of claim 1, further comprising:

transmitting, to the network entity on at least one third set of resources, at least one other repetition of the feedback when the feedback comprises the NACK corresponding to the transmission.

4. The method of claim 1, wherein the repetition of the feedback is transmitted based on a set of measurement values associated with a channel on which to communicate with the network entity.

5. The method of claim 4, wherein the set of measurement values comprises a value of at least one of a reference signal received power (RSRP), a reference signal received quality (RSRQ), a signal-to-interference-plus-noise ratio (SINR), a signal-to-noise ratio (SNR), a signal-to-interference ratio (SIR), a channel quality indicator (CQI), or a reference signal strength indicator (RSSI).

6. The method of claim 4, further comprising:

transmitting, to the network entity, information indicating the set of measurement values; and receiving, from the network entity based on the information indicating the set of measurement values, a configuration associated with transmission of the repetition of the feedback comprising the NACK, wherein the repetition of the feedback comprising the NACK is transmitted based on the configuration.

7. The method of claim 1, further comprising:

receiving a configuration activating the repetition of the feedback comprising the NACK, wherein the repetition of the feedback comprising the NACK is transmitted after reception of the configuration.

8. The method of claim 1, further comprising:

receiving, from the network entity, downlink control information (DCI) indicating a semi-persistent scheduling (SPS) configuration associated with the second set of resources, wherein the repetition of the feedback comprising the NACK is transmitted after reception of the SPS configuration.

9. The method of claim 8, wherein the SPS configuration indicates one grant for transmission of the repetition of the feedback comprising the NACK on the second set of resources, and further indicates at least one other grant for transmission of at least one other repetition of the feedback comprising the NACK on at least one third set of resources.

10. The method of claim 1, wherein the first set of resources and the second set of resources respectively comprise at least one of a set of time resources, a set of frequency resources, or a set of spatial resources, wherein a respective set of the spatial resources comprises a beam of the network entity.

11. The method of claim 1, wherein the first set of resources is different from the second set of resources.

12. A method of wireless communication at a network entity, comprising:

decoding feedback received from a user equipment (UE) on a first set of resources, the feedback comprising an acknowledgement (ACK) or a non-ACK (NACK) corresponding to a transmission to the UE, the first set of resources comprising a first beam corresponding to a beam link used for the transmission from the network entity; and decoding a repetition of the feedback received from the UE on a second set of resources when the feedback decoded on the first set of resources comprises the NACK corresponding to the transmission, the second set of resources comprising a second beam different from the first beam, the second beam corresponding to a secondary beam link used for the transmission from the network entity.

13. The method of claim 12, further comprising:

transmitting, to the UE, information indicating the first set of resources allocated for the feedback comprising the ACK or the NACK corresponding to the transmission; and transmitting, to the UE, information indicating the second set of resources allocated for the repetition of the feedback comprising the NACK corresponding to the transmission.

14. The method of claim 12, further comprising:

decoding at least one other repetition of the feedback received from the UE on at least one third set of resources when the feedback comprises the NACK corresponding to the transmission.

15. The method of claim 12, further comprising:

receiving, from the UE, information indicating a set of measurement values associated with a channel on which to communicate with the UE; and transmitting, to the UE based on the information indicating the set of measurement values, a configuration associated with transmission of the repetition of the feedback comprising the NACK, wherein the repetition of the feedback comprising the NACK is decoded based on the configuration.

16. The method of claim 15, wherein the set of measurement values comprises a value of at least one of a reference signal received power (RSRP), a reference signal received quality (RSRQ), a signal-to-interference-plus-noise ratio (SINR), a signal-to-noise ratio (SNR), a signal-to-interference ratio (SIR), a channel quality indicator (CQI), or a reference signal strength indicator (RSSI).

17. The method of claim 12, further comprising:

transmitting, to the UE, a configuration activating the repetition of the feedback comprising the NACK, wherein the repetition of the feedback comprising the NACK is decoded after transmission of the configuration.

18. The method of claim 12, further comprising:

transmitting, to the UE, downlink control information (DCI) indicating a semi-persistent scheduling (SPS) configuration associated with the second set of resources, wherein the repetition of the feedback comprising the NACK is decoded after transmission of the SPS configuration.

19. The method of claim 18, wherein the SPS configuration indicates one grant for transmission of the repetition of the feedback comprising the NACK on the second set of resources, and further indicates at least one other grant for transmission of at least one other repetition of the feedback comprising the NACK on at least one third set of resources.

20. The method of claim 12, wherein the first set of resources and the second set of resources respectively comprise at least one of a set of time resources, a set of frequency resources, or a set of spatial resources, wherein a respective set of the spatial resources comprises a beam of the network entity.

21. The method of claim 12, wherein the first set of resources is different from the second set of resources.

22. The method of claim 12, further comprising:

refraining from decoding information on the second set of resources when the feedback decoded on the first set of resources comprises the ACK corresponding to the transmission.

23. An apparatus for wireless communication at a user equipment (UE), comprising:

a memory; and at least one processor coupled to the memory and configured to:

transmit, to a network entity on a first set of resources, feedback comprising an acknowledgement (ACK) or a non-ACK (NACK) corresponding to a transmission from the network entity, the feedback being transmitted without repetition when the feedback comprises the ACK corresponding to the transmission, the first set of resources comprising a first beam corresponding to a beam link used for the transmission from the network entity; and transmit, to the network entity on a second set of resources, a repetition of the feedback when the feedback comprises the NACK corresponding to the transmission, the second set of resources comprising a second beam different from the first beam, the second beam corresponding to a secondary beam link used for the transmission from the network entity.

24. The apparatus of claim 23, wherein the at least one processor is further configured to:

receive information indicating the first set of resources allocated for the feedback comprising the ACK or the NACK corresponding to the transmission; and receive information indicating the second set of resources allocated for the repetition of the feedback comprising the NACK corresponding to the transmission.

25. The apparatus of claim 23, wherein the at least one processor is further configured to:

transmit, to the network entity on at least one third set of resources, at least one other repetition of the feedback when the feedback comprises the NACK corresponding to the transmission.

26. The apparatus of claim 23, wherein the repetition of the feedback is transmitted based on a set of measurement values associated with a channel on which to communicate with the network entity.

27. The apparatus of claim 26, wherein the set of measurement values comprises a value of at least one of a reference signal received power (RSRP), a reference signal received quality (RSRQ), a signal-to-interference-plus-noise ratio (SINR), a signal-to-noise ratio (SNR), a signal-to-interference ratio (SIR), a channel quality indicator (CQI), or a reference signal strength indicator (RSSI).

28. An apparatus for wireless communication at a network entity, comprising:

a memory; and at least one processor coupled to the memory and configured to:

decode feedback received from a user equipment (UE) on a first set of resources, the feedback comprising an acknowledgement (ACK) or a non-ACK (NACK) corresponding to a transmission to the UE, the first set of resources comprising a first beam corresponding to a beam link used for the transmission from the network entity; and decode a repetition of the feedback received from the UE on a second set of resources when the feedback decoded on the first set of resources comprises the NACK corresponding to the transmission, the second set of resources comprising a second beam different from the first beam, the second beam corresponding to a secondary beam link used for the transmission from the network entity.

29. The apparatus of claim 28, wherein the at least one processor is further configured to:

transmit, to the UE, information indicating the first set of resources allocated for the feedback comprising the ACK or the NACK corresponding to the transmission; and transmit, to the UE, information indicating the second set of resources allocated for the repetition of the feedback comprising the NACK corresponding to the transmission.

30. The apparatus of claim 28, wherein the at least one processor is further configured to:

decode at least one other repetition of the feedback received from the UE on at least one third set of resources when the feedback comprises the NACK corresponding to the transmission.

* * * * *